US006663790B2

(12) United States Patent
Kowarz et al.

(10) Patent No.: US 6,663,790 B2
(45) Date of Patent: *Dec. 16, 2003

(54) METHOD FOR MANUFACTURING A MECHANICAL CONFORMAL GRATING DEVICE WITH IMPROVED CONTRAST AND LIFETIME

(75) Inventors: Marek W. Kowarz, Henrietta, NY (US); John A. Lebens, Rush, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/158,516

(22) Filed: May 30, 2002

(65) Prior Publication Data

US 2002/0195418 A1 Dec. 26, 2002

Related U.S. Application Data

(63) Continuation-in-part of application No. 09/867,927, filed on May 30, 2001, which is a continuation-in-part of application No. 09/491,354, filed on Jan. 26, 2000, now Pat. No. 6,307,663.

(51) Int. Cl.[7] .......................... C23F 1/00; B29D 11/00; H01B 13/00

(52) U.S. Cl. ................. 216/24; 216/2; 216/13

(58) Field of Search ................. 216/2, 13, 24; 437/927; 359/291–295, 213, 224, 226, 278, 281; 438/29, 24, 22, 16, 31

(56) References Cited

U.S. PATENT DOCUMENTS

| | | | |
|---|---|---|---|
| 4,626,920 A | | 12/1986 | Glenn |
| 4,857,978 A | | 8/1989 | Goldburt et al. |
| 5,311,360 A | | 5/1994 | Bloom et al. |
| 5,459,610 A | | 10/1995 | Bloom et al. |
| 5,661,592 A | * | 8/1997 | Bornstein et al. ............ 359/291 |
| 5,677,783 A | * | 10/1997 | Bloom et al. ............... 359/224 |
| 5,706,067 A | * | 1/1998 | Colgan et al. ............... 349/114 |
| 5,841,579 A | | 11/1998 | Bloom et al. |
| 6,238,581 B1 | * | 5/2001 | Hawkins et al. ............... 216/13 |
| 6,301,000 B1 | | 10/2001 | Johnson |

* cited by examiner

Primary Examiner—Parviz Hassanzodel
Assistant Examiner—Roberts P Culbert
(74) Attorney, Agent, or Firm—Stephen H. Shaw

(57) ABSTRACT

A method of manufacturing a mechanical grating device, including the steps of: forming a spacer layer on a substrate; removing portions of the spacer layer to define an active region; forming a sacrificial layer in the active region; forming conductive reflective ribbon elements over the active region; annealing the mechanical grating device at an annealing temperature greater than 150° C.; and removing the sacrificial layer from the active region to release the conductive reflective ribbon elements.

19 Claims, 18 Drawing Sheets

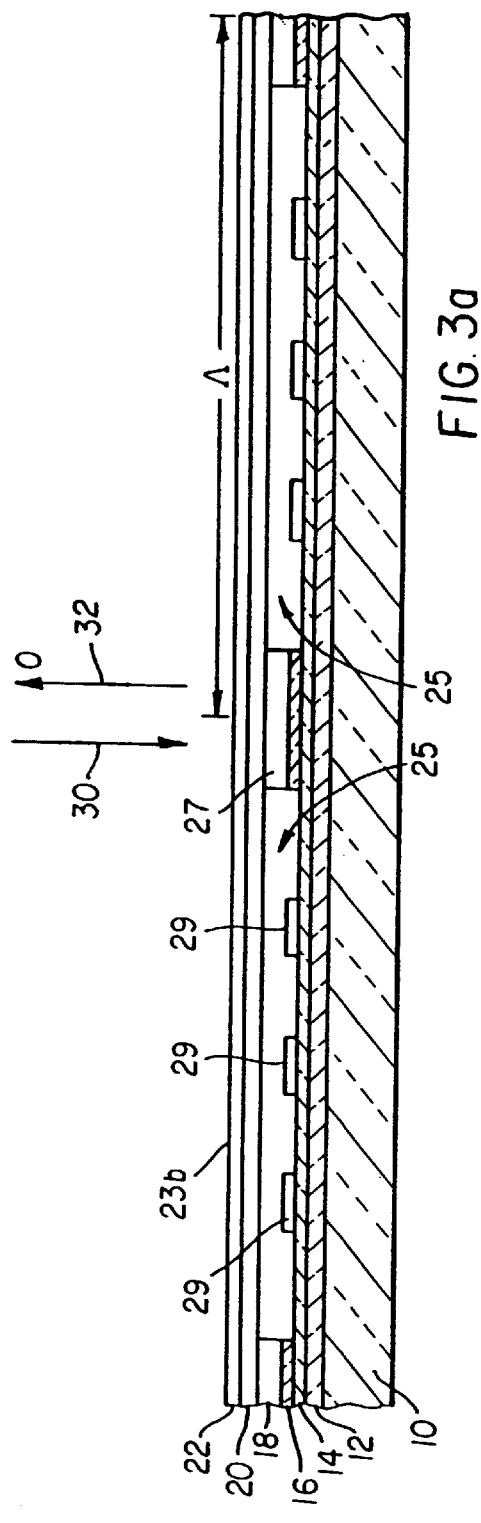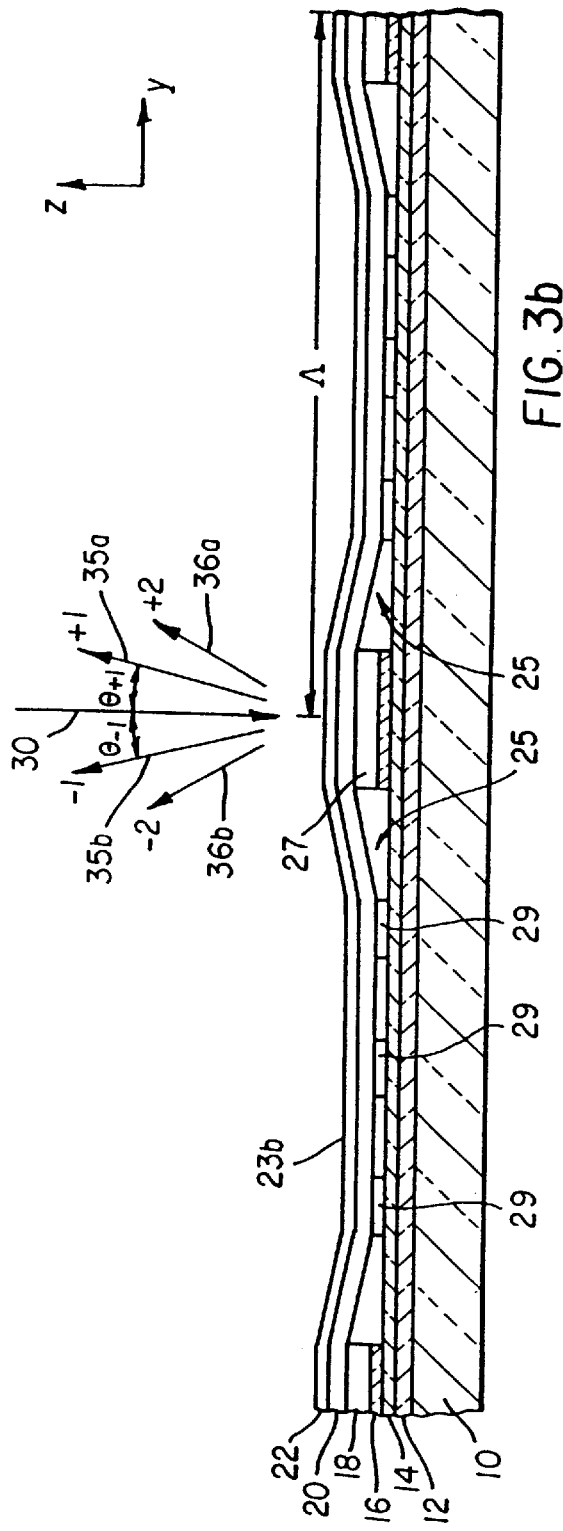
FIG. 3a
FIG. 3b

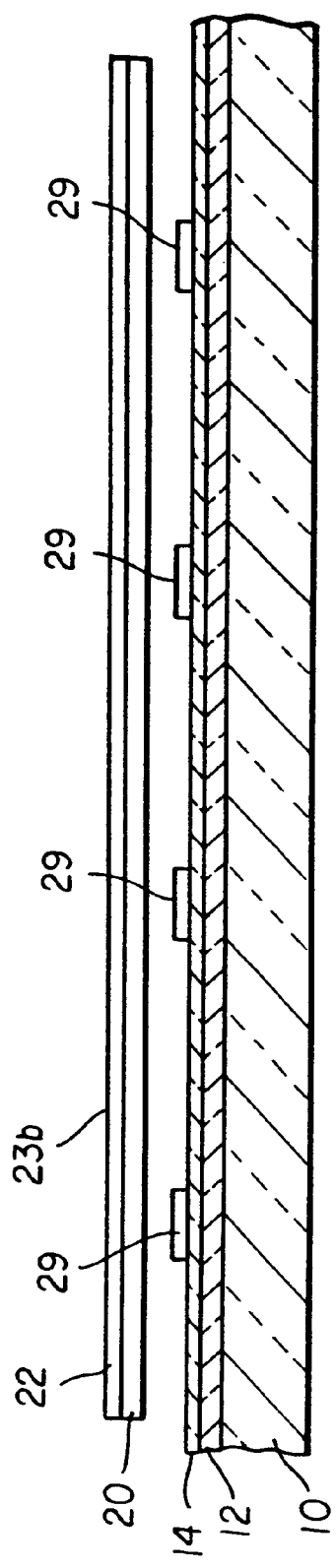
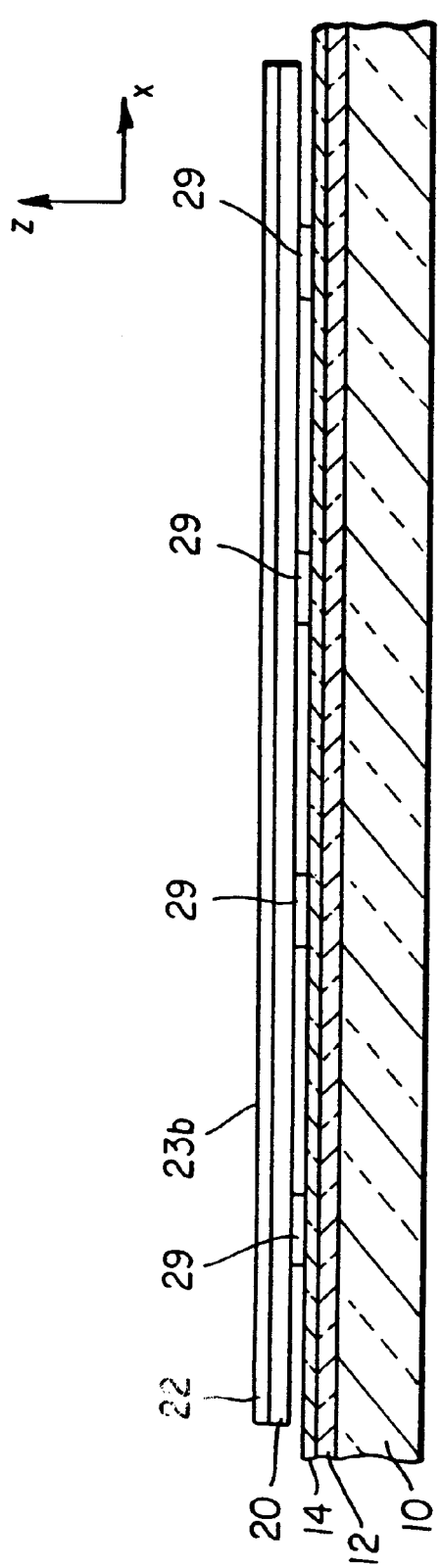
FIG. 4a
FIG. 4b

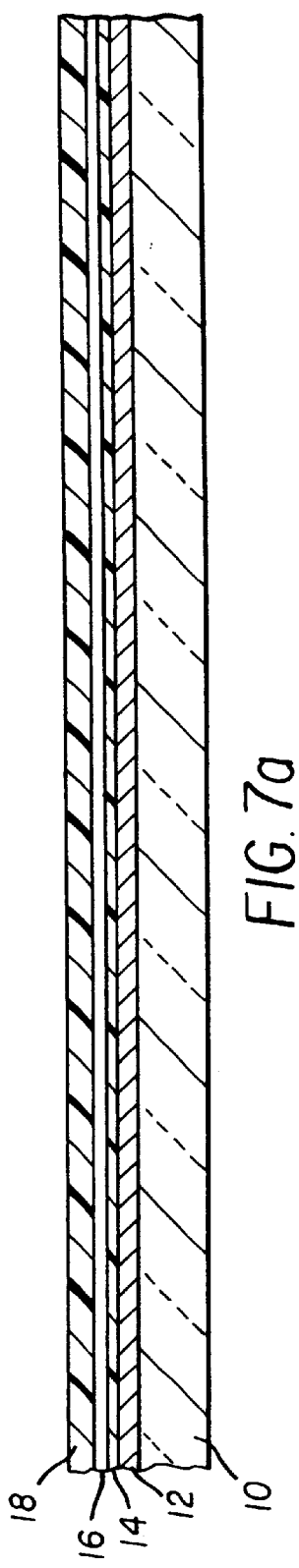
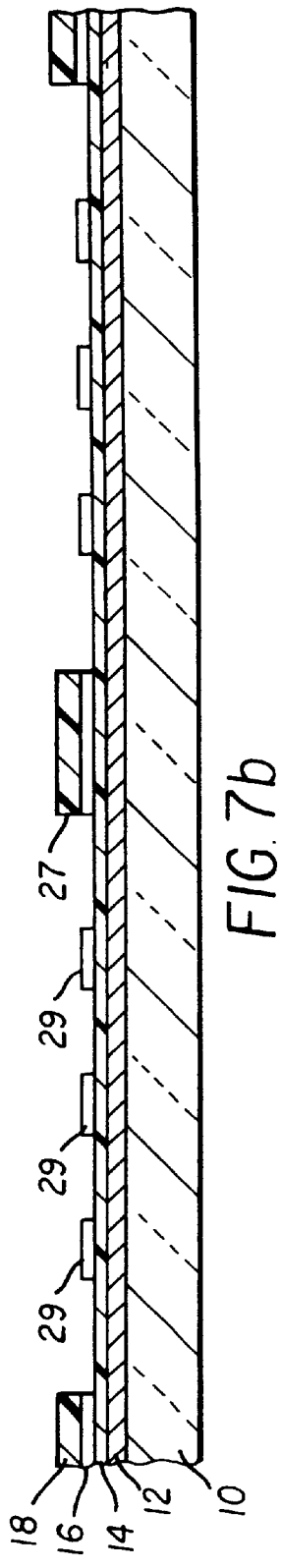
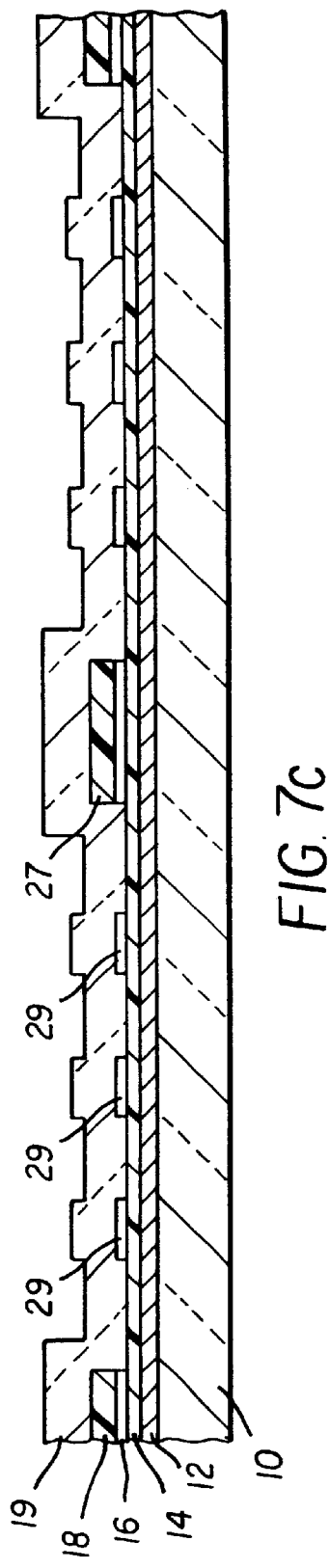

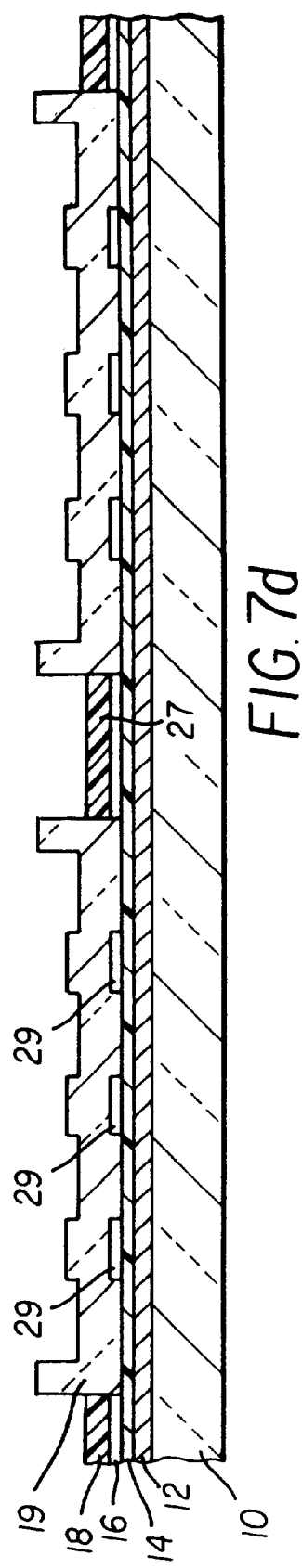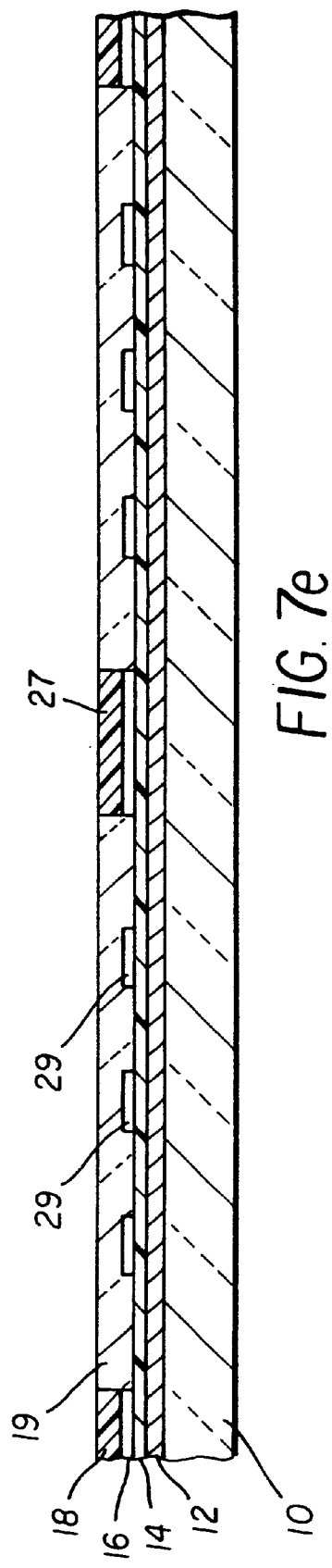

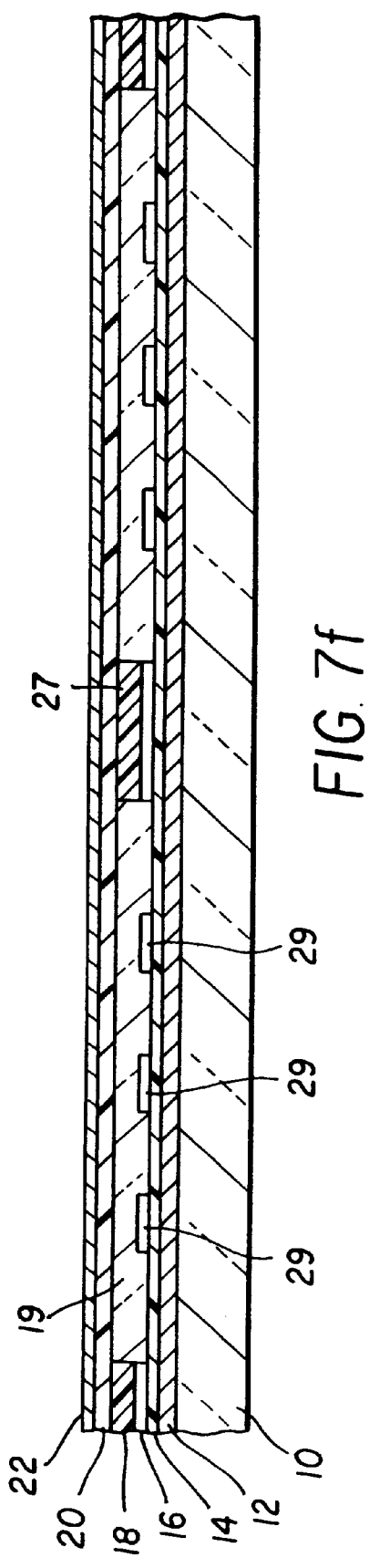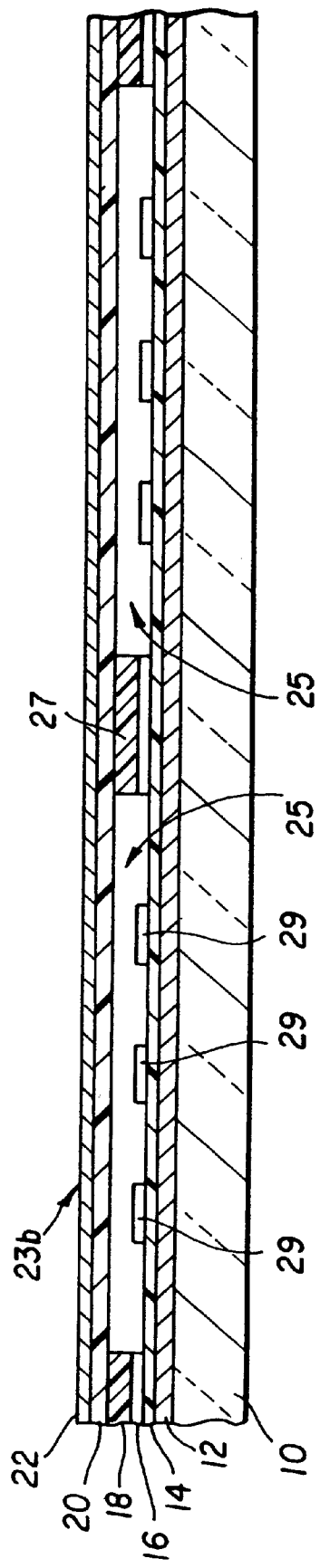

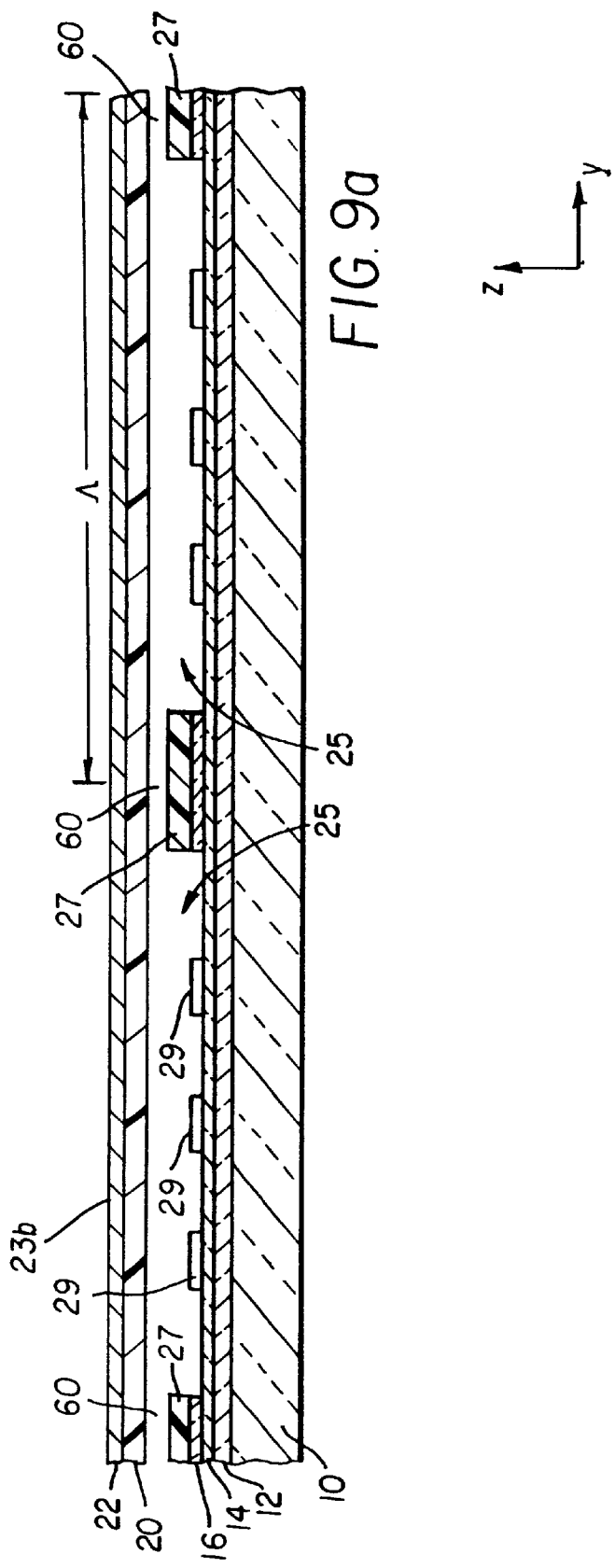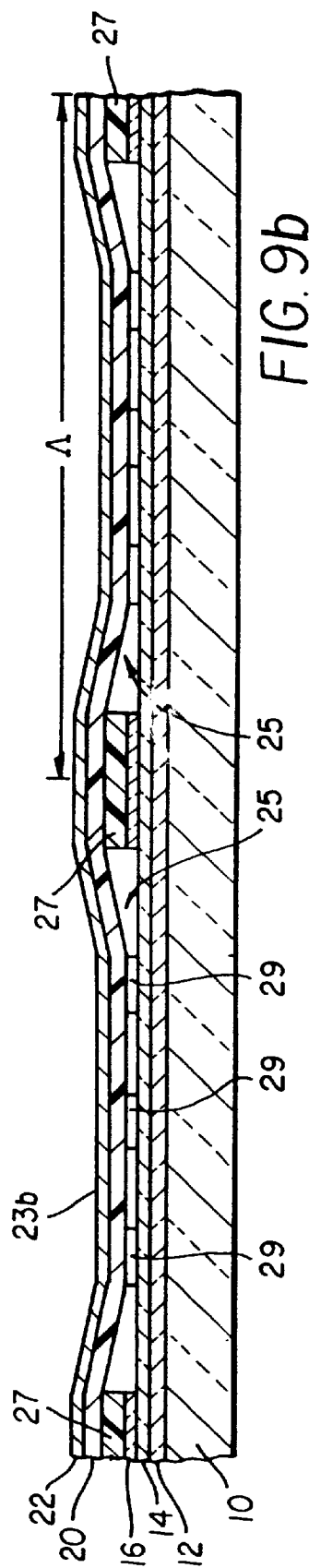

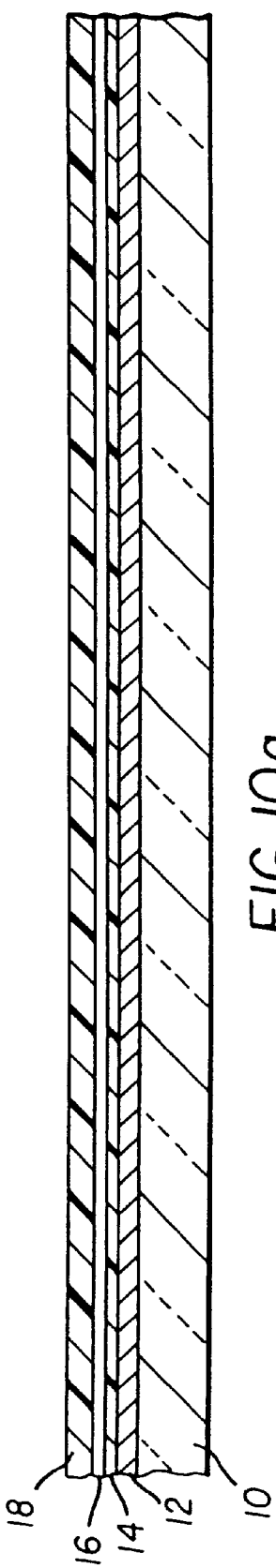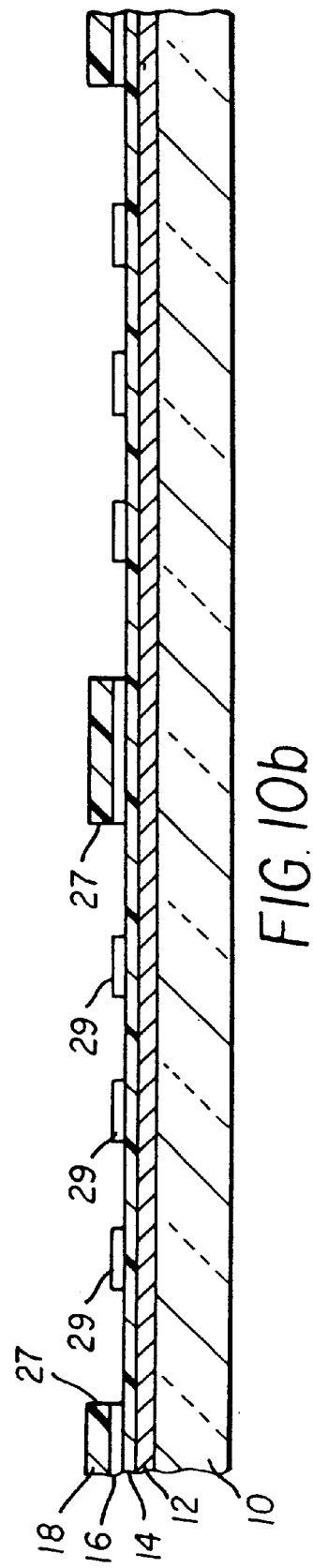

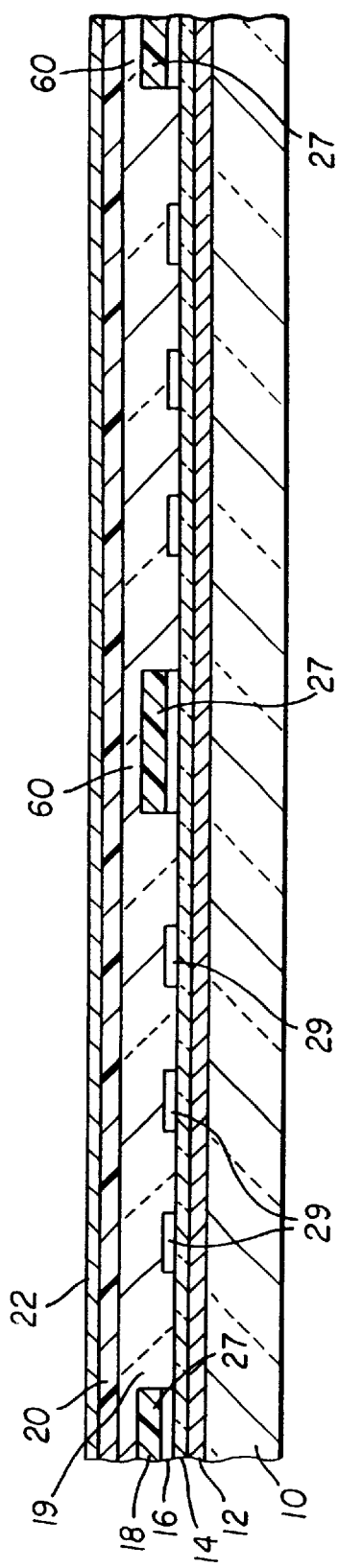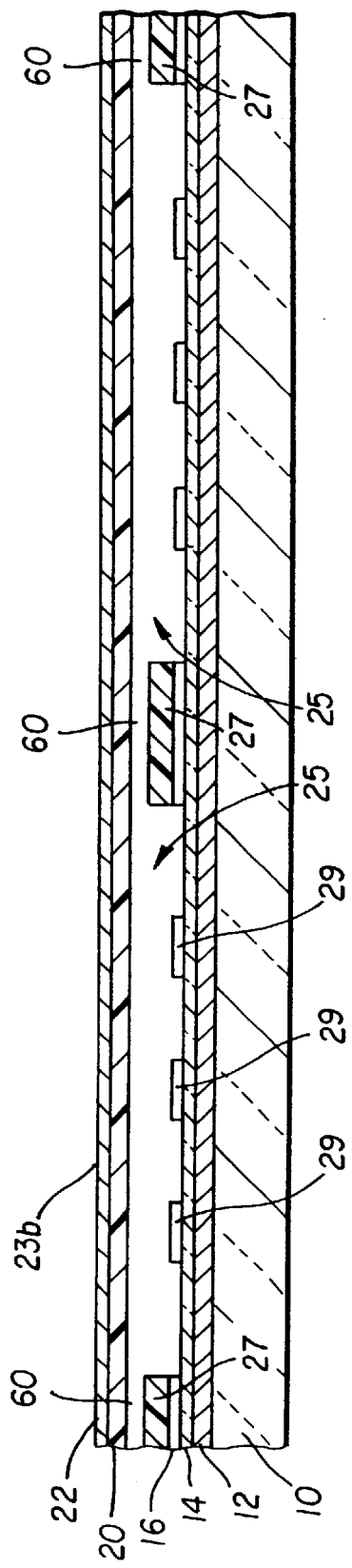

METHOD FOR MANUFACTURING A MECHANICAL CONFORMAL GRATING DEVICE WITH IMPROVED CONTRAST AND LIFETIME

CROSS REFERENCE TO RELATED APPLICATION

This is a continuation-in-part of U.S. application Ser. No. 09/867,927, filed May 30, 2001, entitled A Method For Manufacturing A Mechanical Conformal Grating Device, by Kowarz et al., which is a continuation-in-part of U.S. application Ser. No. 09/491,354, filed Jan. 26, 2000, now U.S. Pat. No. 6,307,663, entitled Spatial Light Modulator With Conformal Grating Device, by Kowarz, issued Oct. 23, 2001.

FIELD OF THE INVENTION

This invention relates to the fabrication of a micromechanical device for spatially and temporally modulating an incident beam of light by diffraction. More particularly, this invention discloses an improved method for manufacturing an electromechanical device with a conformal grating structure to produce high contrast and increased device life.

BACKGROUND OF THE INVENTION

Electromechanical spatial light modulators with a variety of designs have been used in applications such as display, optical processing, printing, optical data storage, and spectroscopy. These modulators produce spatial variations in the phase and/or amplitude of an incident light beam using arrays of individually addressable devices.

One class of electromechanical spatial light modulators has devices with a periodic sequence of reflective elements that form electromechanical phase gratings. In such devices, the incident light beam is selectively reflected or diffracted into a number of discrete orders. Depending on the application, one or more of these diffracted orders may be collected and used by the optical system. Electromechanical phase gratings can be formed in metallized elastomer gels; see U.S. Pat. No. 4,626,920, issued Dec. 2, 1986 to Glenn, and titled, "Solid State Light Modulator Structure" and U.S. Pat. No. 4,857,978, issued Aug. 15, 1989 to Goldburt et al., and titled "Solid State Light Modulator Incorporating Metallized Gel And Method Of Metallization." The electrodes below the elastomer are patterned so that the application of a voltage deforms the elastomer producing a nearly sinusoidal phase grating. These types of devices have been successfully used in color projection displays.

An electromechanical phase grating with a much faster response time can be made of suspended micromechanical ribbon elements, as described in U.S. Pat. No. 5,311,360, issued May 10, 1994, to Bloom et al., and titled, "Method And Apparatus For Modulating A Light Beam." This device, also known as a grating light valve (GLV), can be fabricated with CMOS-like processes on silicon. Improvements in the device were later described by Bloom et al. that included: 1) patterned raised areas beneath the ribbons to minimize contact area to obviate stiction between the ribbons and the substrate, and 2) an alternative device design in which the spacing between ribbons was decreased and alternate ribbons were actuated to produce good contrast. See U.S. Pat. No. 5,459,610, issued Oct. 17, 1995, to Bloom et al., and titled, "Deformable Grating Apparatus For Modulating A Light Beam And Including Means For Obviating Stiction Between Creating Elements And Underlying Substrate." Bloom et al. also presented a method for fabricating the device; see U.S. Pat. No. 5,677,783, issued Oct. 14, 1997, to Bloom et al., and titled "Method Of Making A Deformable Grating Apparatus For Modulating A Light Beam And Including Means For Obviating Stiction Between Grating Elements And Underlying Substrate." Additional improvements in the design and fabrication of the GLV were described in U.S. Pat. No. 5,841,579, issued Nov. 24, 1998 to Bloom et al., and titled, "Flat Diffraction Grating Light Valve" and in U.S. Pat. No. 5,661,592, issued Aug. 26, 1997 to Bornstein et al., and titled, "Method Of Making And An Apparatus For a Flat Diffraction Grating Light Valve."

Previously mentioned linear GLV arrays have a diffraction direction that is not perpendicular to the array direction, and thus increases the complexity of the optical system required for separating the diffracted orders. Furthermore, the active region of the array is relatively narrow, hence requiring good alignment of line illumination over the entire length of the array, typically to within 10–30 microns over a few centimeters of length. The line illumination then also needs to be very straight over the entire linear array.

There is a need, therefore, for a linear array of grating devices that has a large active region with the diffraction direction perpendicular to the array direction. Furthermore, the device must be able to diffract light efficiently at high speed into discrete orders and the device fabrication must be compatible with CMOS-like processes.

SUMMARY OF THE INVENTION

The need is met according to the present invention by providing a method of manufacturing a mechanical grating device, including the steps of: forming a spacer layer on a substrate; removing portions of the spacer layer to define an active region; forming a sacrificial layer in the active region; forming conductive reflective ribbon elements over the active region; annealing the mechanical grating device at an annealing temperature greater than 150° C.; and removing the sacrificial layer from the active region to release the conductive reflective ribbon elements.

BRIEF DESCRIPTION OF THE DRAWINGS

FIGS. 3a and 3b are cross-sectional views through line 3,7—3,7 in FIG. 2, showing the operation of an electromechanical conformal grating device in an unactuated state and an actuated state, respectively;

FIGS. 4a and 4b are cross-sectional views through line 4—4 in FIG. 2 showing the device in an unactuated state and an actuated state, respectively;

FIG. 7a is a cross-sectional view through line 3,7—3,7 in FIG. 2 illustrating the layer structure prior to any patterning;

FIG. 7b is a cross-sectional view through line 3,7—3,7 in FIG. 2 illustrating patterning of the active region to form channels and intermediate supports;

FIG. 7c is a cross-sectional view through line 3,7—3,7 in FIG. 2 illustrating deposition of a sacrificial layer;

FIG. 7d is a cross-sectional view through line 3,7—3,7 in FIG. 2 illustrating patterning of the sacrificial layer;

FIG. 7e is a cross-sectional view through line 3,7—3,7 in FIG. 2 illustrating planarizing of the sacrificial layer;

FIG. 7f is a cross-sectional view through line 3,7—3,7 in FIG. 2 illustrating deposition of a ribbon layer and a reflective and conductive layer;

FIG. 7g is a cross-sectional view through line 3,7—3,7 in FIG. 2 illustrating removal of the sacrificial layer after patterning elongated ribbon elements;

FIG. 9a is a cross-sectional view of an alternative embodiment of the conformal grating device in an unactuated state;

FIG. 9b is a cross sectional view of an alternative embodiment of the conformal grating device in an actuated state;

FIGS. 10a–10f illustrate the fabrication steps used to make an alternative embodiment of the conformal grating device;

DETAILED DESCRIPTION OF THE INVENTION

Figure 1:
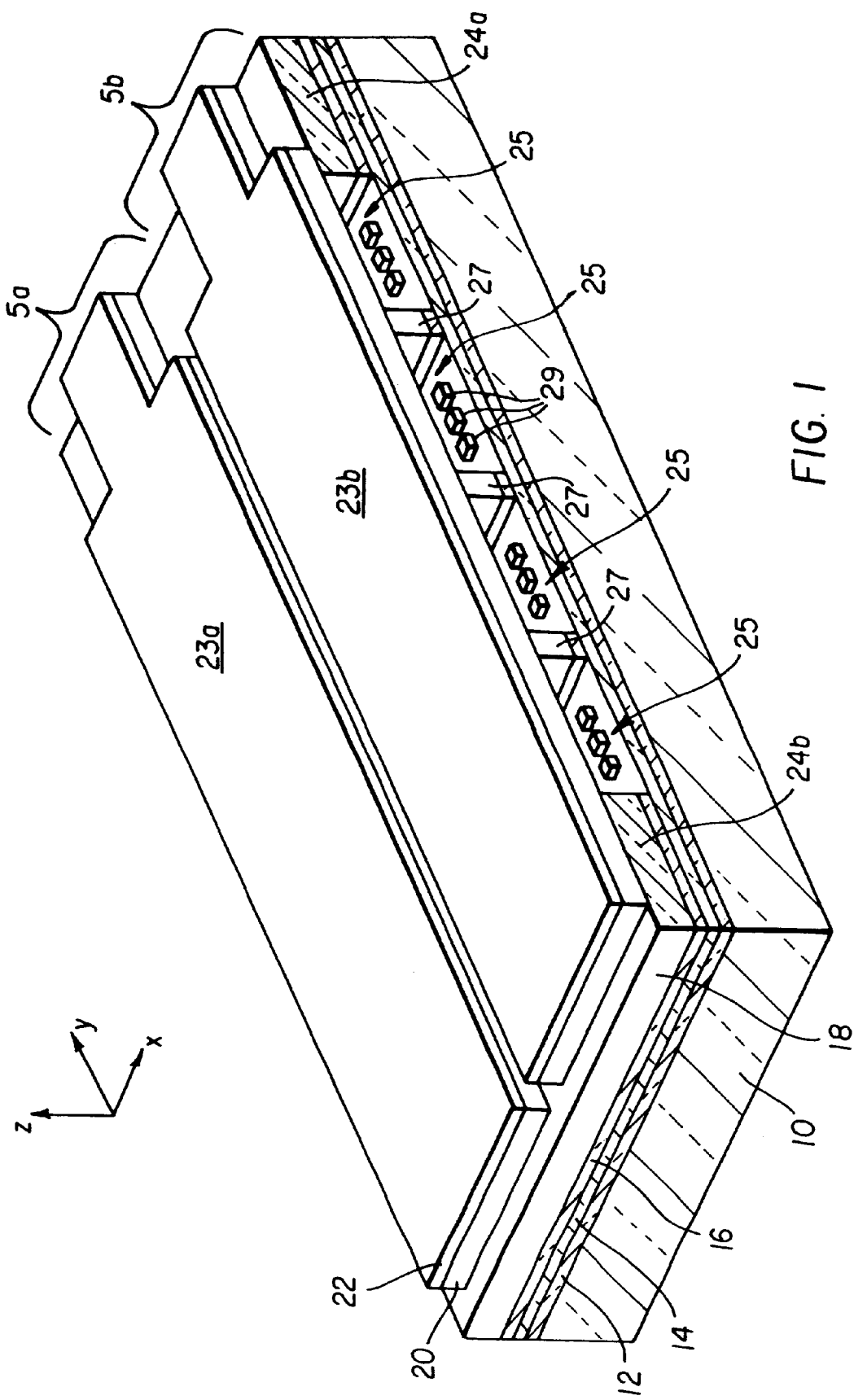
FIG. 1 is a perspective, partially cut-away view of a spatial light modulator with electromechanical conformal grating devices, showing two devices in a linear array.

The conformal grating devices of the preferred embodiment of the present invention are illustrated in FIGS. 1–4. FIG. 1 shows the structure of two side-by-side conformal grating devices 5a and 5b in an unactuated state. In this embodiment, the devices can be operated by the application of an electrostatic force. A substrate 10 made of glass, metal, plastic, or semiconductor materials, is covered by a bottom conductive layer 12. The grating devices 5a and 5b are formed on top of the bottom conductive layer 12 and the substrate 10. The bottom conductive layer 12 acts as an electrode to actuate the devices. The bottom conductive layer 12 can be made of materials such as aluminum, titanium, gold, silver, tungsten, doped silicon, or indium tin oxide. A dielectric protective layer 14 covers the bottom conductive layer 12. Above the protective layer 14a standoff layer 16 is formed which is followed by a spacer layer 18. On top of the spacer layer 18, a ribbon layer 20 is formed which is covered by a reflective layer 22. In the present embodiment, the reflective layer 22 is also a conductor in order to provide electrodes for the actuation of the conformal grating devices 5a and 5b. The reflective and conductive layer 22 is patterned to provide electrodes to the two conformal grating devices 5a and 5b. The ribbon layer 20 preferably comprises a material with a sufficient tensile stress to provide a large restoring force. Examples of ribbon materials are silicon nitride, titanium aluminide, and titanium oxide. The thickness and tensile stress of the ribbon layer 20 are chosen to optimize performance by influencing the electrostatic force for actuation and the restoring force. These forces affect the voltage requirement, speed, and resonance frequency of the conformal grating devices 5a and 5b.

Each of the two devices 5a and 5b has an associated elongated ribbon element 23a and 23b, respectively, patterned from the reflective and conductive layer 22 and the ribbon layer 20, and herein referred to as elongated conductive reflective ribbon elements. The elongated conductive reflective ribbon elements 23a and 23b are supported by end supports 24a and 24b formed from the spacer layer 18 and by one or more intermediate supports 27. In FIG. 1, three intermediate supports 27 are shown formed from the spacer layer 18. These intermediate supports 27 are uniformly separated in order to form four equal-width channels 25. The elongated conductive reflective ribbon elements 23a and 23b are secured to the end supports 24a and 24b and to the intermediate supports 27. The end supports 24a and 24b are not defined other than at their edges facing the channel 25. A plurality of square standoffs 29 is patterned at the bottom of the channels 25 from the standoff layer 16. These standoffs 29 reduce the possibility of the ribbon elements sticking when actuated. The standoffs may also be patterned in shapes other than square, for example, rectangular or round.

Figure 2:
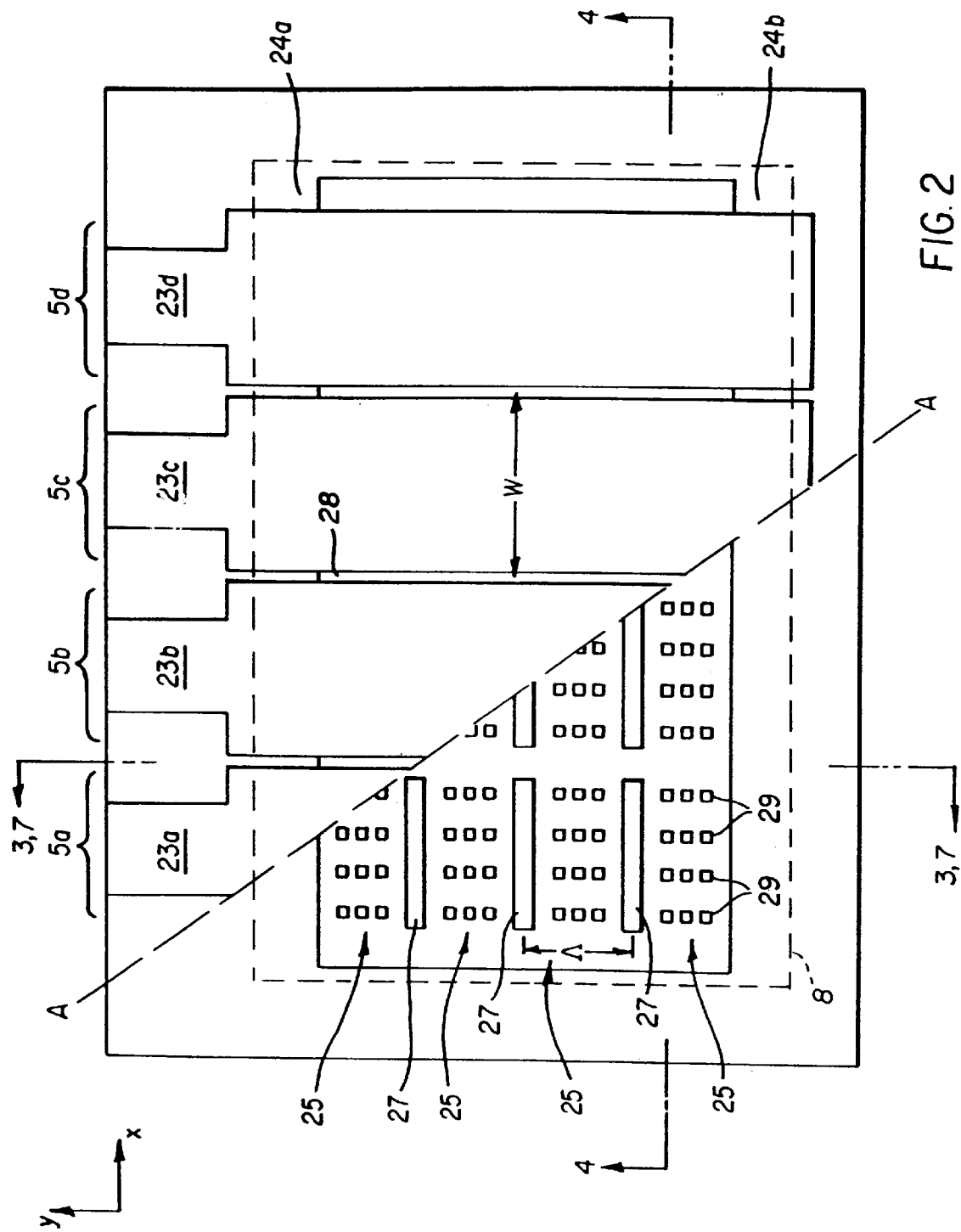
FIG. 2 is a top view of a spatial light modulator with electromechanical conformal grating devices, showing four individually operable devices in a linear array.

A top view of a four-device linear array of conformal grating devices 5a, 5b, 5c and 5d is shown in FIG. 2. The elongated conductive reflective ribbon elements are depicted partially removed over the portion of the diagram below the line A—A in order to show the underlying structure. For best optical performance and maximum contrast, the intermediate supports 27 must be completely hidden below the elongated conductive reflective ribbon elements 23a, 23b, 23c and 23d. Therefore, when viewed from the top, the intermediate supports 27 must not be visible in the gaps 28 between the conformal grating devices 5a–d. Here, each of the conformal grating devices 5a–5d has three intermediate supports 27 with four equal-width channels 25. The active region 8 is the portion of the device where the electromechanical actuation takes place and contains the channels 25, the intermediate supports 27 and the end supports 24a and 24b. The active region 8 is completely covered by the ribbon layer 20 (as shown in FIG. 1) in the form of the elongated-conductive reflective ribbon elements 23a, 23b, 23c, and 23d.

The center-to-center separation Λ of the intermediate supports 27 defines the period of the conformal grating devices in the actuated state. The elongated conductive reflective ribbon elements 23a–23d are mechanically and electrically isolated from one another allowing independent operation of the four conformal grating devices 5a–5d. The bottom conductive layer 12 of FIG. 1 can be common to all of the devices.

FIG. 3a is a side view, through line 3,7—3,7 of FIG. 2, of two channels 25 of the conformal grating device 5b in the unactuated state. FIG. 3b shows the same view of the actuated state. For operation of the device, an attractive electrostatic force is produced by applying a voltage difference between the bottom conductive layer 12 and the reflective and conductive layer 22 of the elongated conductive reflective ribbon element 23b. In the unactuated state (see FIG. 3a), with no voltage difference, the elongated conductive reflective ribbon element 23b is suspended flat between the end supports 24a and 24b. In this state, an incident light beam 30 is primarily reflected 32 into the mirror direction. To obtain the actuated state, a voltage is applied to the conformal grating device 5b, which deforms the elongated conductive reflective ribbon element 23b and produces a partially conformal grating with period Λ. FIG. 3b shows the device in the fully actuated state with the elongated conductive reflective ribbon element 23b in contact with the standoffs 29. The height difference between the bottom of element 23b and the top of the standoffs 29 is chosen to be approximately ¼ of the wavelength λ of the incident light. The optimum height depends on the specific shape of the actuated device. In the actuated state, the incident light beam 30 is primarily diffracted into the +1st order 35a and −1st order 35b, with additional light diffracted into the +2nd order 36a and −2nd order 36b. A small amount of light is diffracted into even higher orders and some is reflected. For light incident perpendicular to the surface of the device, the angle θm between the incident beam and the mth order diffracted beam is given by $$\sin \theta_m = m\lambda/\Lambda,$$

where m is an integer. One or more of the diffracted orders can be collected and used by the optical system, depending on the application. When the applied voltage is removed, the forces due to the tensile stress and bending restores the ribbon element 23b to its original unactuated state.

FIGS. 4a and 4b show a rotated side view through line 4—4 of FIG. 2 of the conformal grating device 5b in the unactuated and actuated states, respectively. The elongated conductive reflective ribbon element 23b is suspended by the end supports 24a and 24b and the adjacent intermediate support 27 (not shown in this perspective). The application of a voltage actuates the device as illustrated in FIG. 4b.

To understand the electromechanical and optical operation of the conformal grating device in more detail, it is helpful to examine the expected performance of a realistic design with the following materials and parameters:

Substrate material: silicon
Bottom conductive layer: doped silicon
Protective layer: silicon dioxide, thickness=50 nm
Spacer layer: silicon dioxide, thickness=150 nm
Ribbon layer: silicon nitride, thickness=100 nm, tensile stress=600 Mpa
Reflective and conductive layer: aluminum, thickness=50 nm
Grating period Λ=20 μm
Suspended length of conductive reflective ribbon element=16 μm
Width of conductive reflective ribbon element w=30 μm
Width of intermediate supports=4 μm This type of design allows for fabrication with CMOS methods and integration with CMOS circuitry. The resonant frequency of the elongated conductive ribbon elements in this particular design is approximately 11 MHz. Most practical designs have resonant frequencies between 2 MHz and 15 MHz. Because of this high resonance, the switching time of the device can be very short.

Figure 5:
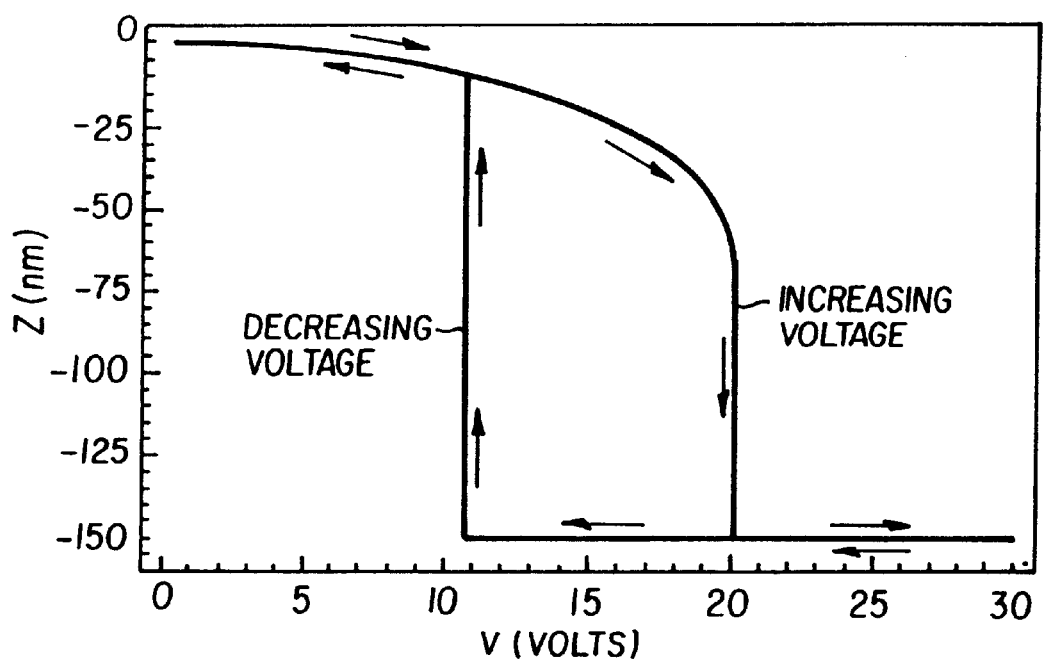
FIG. 5 is a plot showing ribbon element position as a function of applied voltage.
Figure 6:
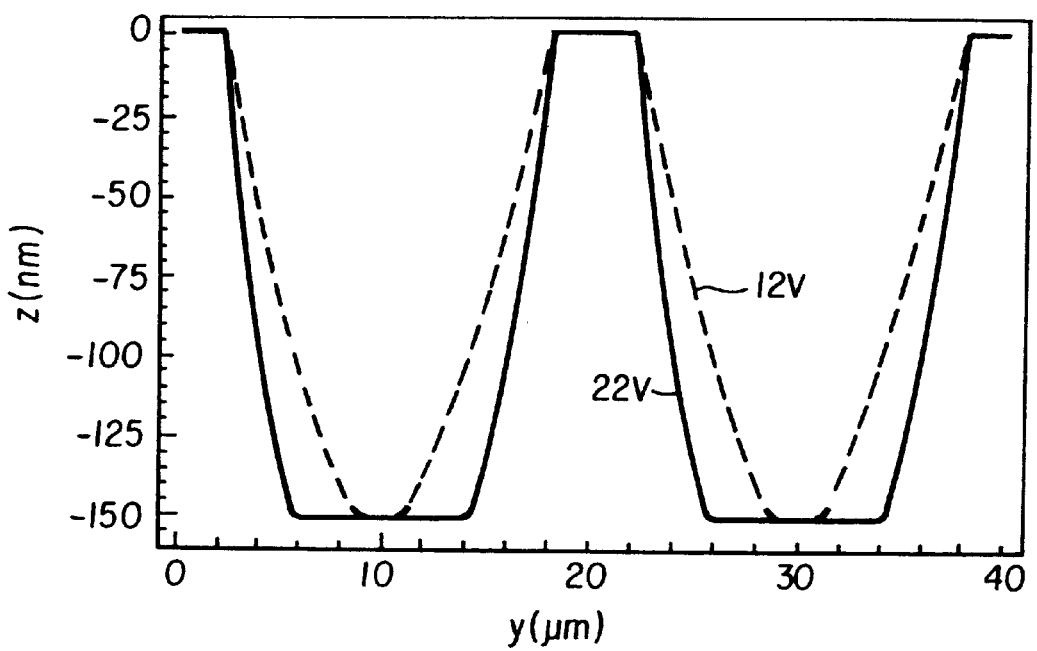
FIG. 6 is a diagram showing the device profile in response to two different actuation voltages.

FIGS. 5 and 6 show the modeled electromechanical operation of this particular device. FIG. 5 is a plot of the position of the elongated conductive reflective ribbon element at the center of a channel as a function of applied voltage, illustrating the associated hysteresis. As the voltage is increased from 0 V, the center displacement increases in approximately a quadratic manner until the pull-down voltage of 20.1 V is reached. At this voltage, the electrostatic force overcomes the tensile restoring force and the elongated conductive reflective ribbon element slams into the substrate. Further increasing the applied voltage changes the shape of the deformed elongated conductive reflective ribbon element, but cannot change the center position. With the elongated conductive reflective ribbon element in contact with the substrate, the voltage can be reduced below the pull-down value while maintaining contact, until release at 10.8 V. This hysteresis can be exploited to improve the optical performance of the device. It can also be used as a switch in certain applications.

FIG. 6 demonstrates how the grating profile may be modified by adjusting the applied voltage. The profile of two periods of the actuated device is shown at 12V (dotted line) and at 22V (solid line), with the ribbon and substrate in contact. To obtain this 12V profile, contact must first be established by applying a value larger than the pull-down voltage of 20.1 V. Because 12V is only slightly larger that the release voltage, only a small portion of the elongated conductive reflective ribbon element touches the substrate. This change in shape with voltage has an important impact on the diffraction efficiency of the device.

The fabrication sequence for making a conformal grating device is depicted in FIGS. 7a–7g. FIG. 7a, which is a cross-sectional view along line 3,7—3,7 indicated in FIG. 2, illustrates the layer build-up of one embodiment of the invention with standoffs 29 formed at the bottom of the channels 25. The device is built upon a substrate 10, covered by the bottom conductive layer 12, and a dielectric protective layer 14 on top of the bottom conductive layer 12. As mentioned above, the substrate 10 can be glass, plastic, metal, or a semiconductor material. In one embodiment, the substrate 10 is silicon and the dielectric protective layer 14 is a thermal oxide. An epitaxial layer, doping by diffusion, or ion implantation can form the bottom conductive layer 12. To form the standoffs 29 and channels 25, a standoff layer 16 is deposited followed by a spacer layer 18. The spacer layer 18 is selected from the group consisting of silicon oxide, silicon nitride polysilicon, and polyimide. In one embodiment, the standoff layer 16 is silicon nitride, deposited by chemical vapor deposition, and the spacer layer 18 is silicon oxide deposited by chemical vapor deposition. The total height of the actuation of the elongated conductive reflective ribbon elements 23a–23d is defined by the thickness of the spacer layer 18.

FIG. 7b, which is a cross-sectional view along line 3,7—3,7 indicated in FIG. 2, illustrates the etching of the channels 25 to form the intermediate supports 27. The patterning of the spacer layer 18 is carried out using standard photolithographic processing and etching methods to define the active region 8 where the channels 25 and intermediate supports 27 are located. The etching of the spacer layer 18 uses chemistry designed to stop on the silicon nitride standoff layer 16. The standoff layer 16 is then patterned using photolithographic processing and etching methods to produce the standoffs 29, as illustrated in FIG. 7b. The standoffs 29 act as mechanical stops for the actuation of the conformal grating device. The actuated elongated conductive reflective ribbon elements 23a–23d come into contact with the standoffs 29.

FIG. 7c, which is a cross-sectional view along line 3,7—3,7 indicated in FIG. 2, illustrates the deposition of a sacrificial layer 19. To allow additional layers atop the existing structure, as shown in FIG. 7c, a conformal sacrificial layer 19 is deposited to a thickness greater than the sum of the thickness of the standoff layer 16 and the spacer layer 18. The material for the sacrificial layer 19 is different from the spacer layer 18 and is selected from the group consisting of silicon oxide, silicon nitride, polysilicon, doped-polysilicon, silicon-germanium alloys, and polyimide. In one embodiment the sacrificial layer 19 is polysilicon deposited by chemical vapor deposition.

FIG. 7d, which is a cross-sectional view along line 3,7—3,7 indicated in FIG. 2, illustrates the patterning of the sacrificial layer 19. The patterning of the sacrificial layer 19 is carried out using standard photolithographic processing and a mask which is the reverse of the mask used to etch the spacer layer 18 defining the active region 8 where the channels 25 and intermediate supports 27 are located. The mask can be biased to account for misalignment. The sacrificial layer 19 is then completely removed from the intermediate supports 27 and the areas outside of the active region 8. The removal of the sacrificial layer 19 outside of the active region 8 improves the uniformity of the planarization step described below. The removal of the sacrificial layer 19 may be done prior to providing the ribbon layer 20. This removal process ensures good mechanical attachment of the elongated conductive reflective ribbon elements 23a–23d to the intermediate supports 27 and the end supports 24a and 25b (not shown in FIG. 7d).

FIG. 7e, which is a cross-sectional view along line 3,7—3,7 indicated in FIG. 2, illustrates the planarization of the sacrificial layer 19 to a level substantially near the top surface of the intermediate supports 27. Chemical mechanical polishing methods are used to achieve the polished structure. The polished surface of sacrificial layer 19 filling the channels 25 is preferably polished to be optically coplanar with the top surface of the intermediate supports 27. As is well known in the practice of optical engineering, this requires a surface planarity of less than about 200 Angstrom units at visible wavelengths.

FIG. 7f, which is a cross-sectional view along line 3,7—3,7 indicated in FIG. 2, illustrates the deposition of the ribbon layer 20 and of the reflective and conductive layer 22. The ribbon layer 20 is provided on top of an optically-coplanar sacrificial layer 19 and intermediate supports 27, thereby also covering the entire active region 8 of the device. Silicon nitride is a well-suited material for the ribbon layer 20 and can be patterned to provide the needed mechanical structure. Its material properties are well suited for the application because of the intrinsic tensile stress easily controlled by the deposition process. In an alternative embodiment, titanium aluminide is used as the ribbon layer 20 material. Its material properties are well suited for the application because its intrinsic tensile stress is easily controlled by sputter deposition and annealing. Titanium aluminide is also electrically conducting. The reflective and conductive layer 22 deposited atop the ribbon layer 20 needs to have good electric conducting properties. The light reflecting properties of the reflective and conductive layer 22 improve the efficiency of diffraction so as to maximize the diffracted light and minimize loss of light by absorption. The material for the reflective and conductive layer 22 is selected from the group consisting of aluminum, titanium, gold, silver, tungsten, silicon alloys, and indium tin oxide.

Electrical contact to the bottom conductive layer 12 can be made from the back side through the substrate 10 if the substrate is electrically conductive. Alternatively, electrical contact can be made on the front side by photolithographically patterning areas outside the active region (not shown) and etching through the spacer layer 18, standoff layer 16 and dielectric protective layer 14.

The elongated conductive reflective ribbon elements 23a–23d are now patterned from the ribbon layer 20 and the reflective and conductive layer 22 using photolithographic processing and etching. This etching process defines the top-view geometry of the elongated conductive reflective ribbon elements 23a–23d shown in FIGS. 1 and 2.

FIG. 7g, which is a cross-sectional view along line 3,7—3,7 indicated in FIG. 2, illustrates the removal of the sacrificial layer 19 from within the active region 8 to form channels 25 and intermediate supports 27. In one embodiment, the sacrificial layer 19 is polysilicon which can be selectively removed by dry etching methods using xenon difluoride to yield the cross-sectional view illustrated in FIG. 7g. The gas has access to the sacrificial layer 19 through the gaps 28 between the elongated conductive reflective ribbon elements 23a–23d. The removal of the sacrificial layer 19 is the final step needed to produce operational conformal grating devices 5a–5d. The devices can now be actuated to operate as described earlier. After removal of the sacrificial layer 19, the elongated conductive reflective ribbon elements 23a–23d remain optically coplanar providing the ribbon layer 20 is deposited with uniform thickness and uniform tensile stress.

Figure 8:
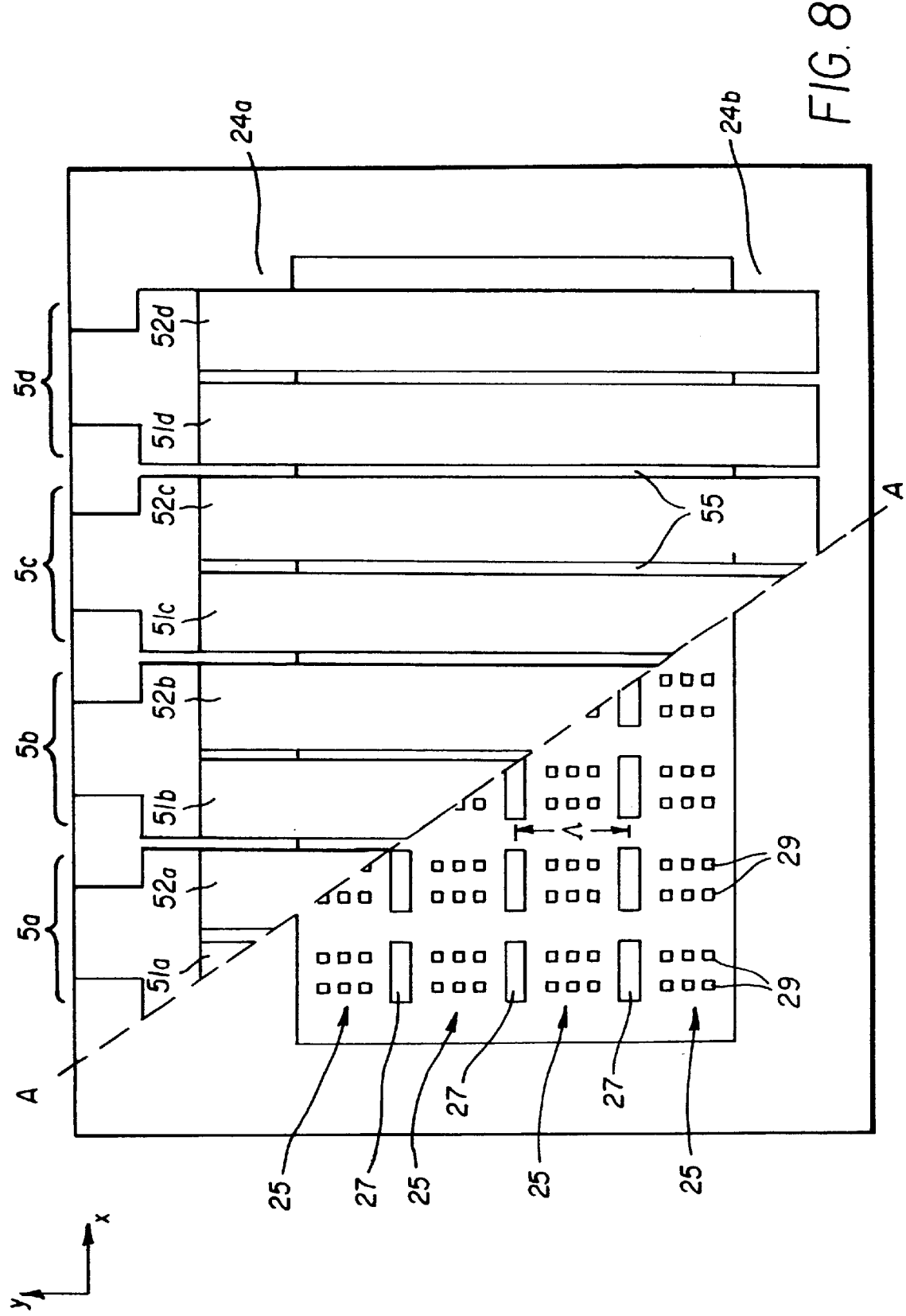
FIG. 8 is a top view of an alternate embodiment of the spatial light modulator.

An alternate embodiment of conformal grating devices is shown in FIG. 8, which depicts a top view of a four-device linear array similar to FIG. 2. Each of the conformal grating devices 5a, 5b, 5c and 5d now has an associated pair of subdivided elongated conductive reflective ribbon elements (51a, 52a), (51b, 52b), (51c, 52c) and (51d, 52d), respectively. This subdivision of each device permits fabrication of wider devices without significantly impacting optical performance. The preferred method of fabrication is to etch a sacrificial layer from the channel, thus releasing the subdivided elongated conductive reflective ribbon elements. The subdivided gaps 55 between the subdivided elongated conductive reflective ribbon elements allow the etchant to access this sacrificial layer. Increasing the number of subdivided gaps 55 can therefore improve the etching process. In practice, it may be necessary to further subdivide the conformal grating devices into more than two. The subdivided elongated conductive reflective ribbon elements are depicted partially removed over the portion of the diagram below the line A—A in order to show the underlying structure. For best optical performance and maximum contrast, the intermediate supports 27 must be completely hidden below the subdivided elongated conductive reflective ribbon elements 51a, 52a, 5b, 52b, 51c, 52c, 51d and 52d. Therefore, when viewed from the top, the intermediate supports 27 must not penetrate into the subdivided gaps 55. The subdivided elongated conductive reflective ribbon elements within a single conformal grating device are mechanically isolated, but electrically coupled. They therefore operate in unison when a voltage is applied.

The conformal grating devices described in the above embodiments have intermediate supports attached to the elongated conductive reflective ribbon elements. To obtain very high contrast, these supports must be completely hidden when the devices are not actuated and the elongated conductive reflective ribbon elements must be completely flat. However, in practice, the fabrication causes some nonuniformity in the profile of the elongated conductive reflective ribbon element just above the intermediate supports. The nonuniformity produces a weak grating reducing the contrast of the device. FIGS. 9a and 9b show an alternate embodiment that reduces this problem. The side view is the same as in FIGS. 3a and 3b. FIG. 9a depicts the two channels 25 between the three intermediate supports 27 of the device in the unactuated state. FIG. 9b shows the same view of the actuated state. In the unactuated state, with no voltage applied to the device, the elongated conductive reflective ribbon element 23b is suspended flat above the intermediate supports 27 by the two end supports 24a and 24b (see FIG. 2), leaving a small intermediate support gap 60 between the top of the intermediate supports 27 and the bottom of the elongated conductive reflective ribbon element 23b. When a voltage is applied to actuate the device, the bottom of the elongated conductive reflective ribbon element 23b makes contact with the top of the intermediate supports 27 and a partially conforming grating is created FIG. 9b shows the device in the fully actuated state with the elongated conductive reflective ribbon element 23b also touching the standoffs 29.

Figure 10C:
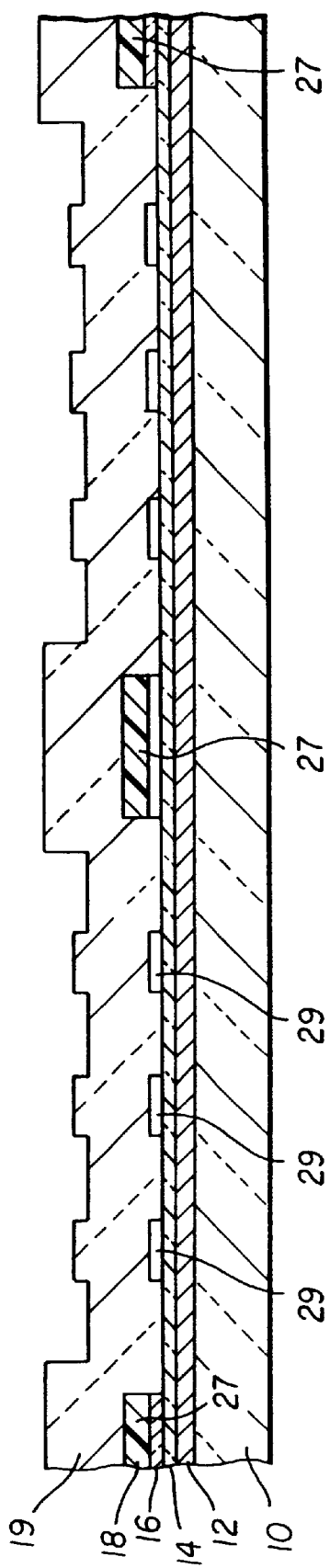

FIGS. 10a–10f illustrate the fabrication sequence for making the conformal grating device with elongated conductive reflective ribbon elements suspended above intermediate supports. These figures show the same view of the device as FIGS. 9a and 9b. The first few steps are the same as the process of FIGS. 7a and 7b. Referring to FIG. 10a, the device is built upon a substrate 10, covered by the bottom conductive layer 12, and a dielectric protective layer 14 on top of the bottom conductive layer 12. To form the standoffs 29 and channels 25, a standoff layer 16 is deposited followed by a spacer layer 18.

FIG. 10b illustrates etching of the channels 25 to form the intermediate supports 27. The patterning of the spacer layer 18 is carried out using standard photolithographic processing and etching methods to define the active region 8 where the channels 25 and intermediate supports 27 are located. The standoff layer 16 is then patterned using photolithographic processing and etching methods to produce the standoffs 29, as illustrated in FIG. 10b.

In order to generate an intermediate support gap 60 with a desired height, the end supports 24a and 24b can be fabricated to be higher than the intermediate supports 27 (not shown in FIG. 10b). This step can be performed by depositing and patterning a support layer made, for example, of silicon nitride to increase the height of the end supports 24a and 24b relative to the intermediate supports.

FIG. 10c illustrates deposition of a conformal sacrificial layer 19 on top of the structure from FIG. 10b. In order to ensure that the planarization step (FIG. 10d) leaves some sacrificial layer 19 on top of the intermediate supports 27, the thickness of the sacrificial layer 19 must be substantially greater that the sum of the thickness of the standoff layer 16 and the thickness of the spacer layer 18.

Figure 10D:
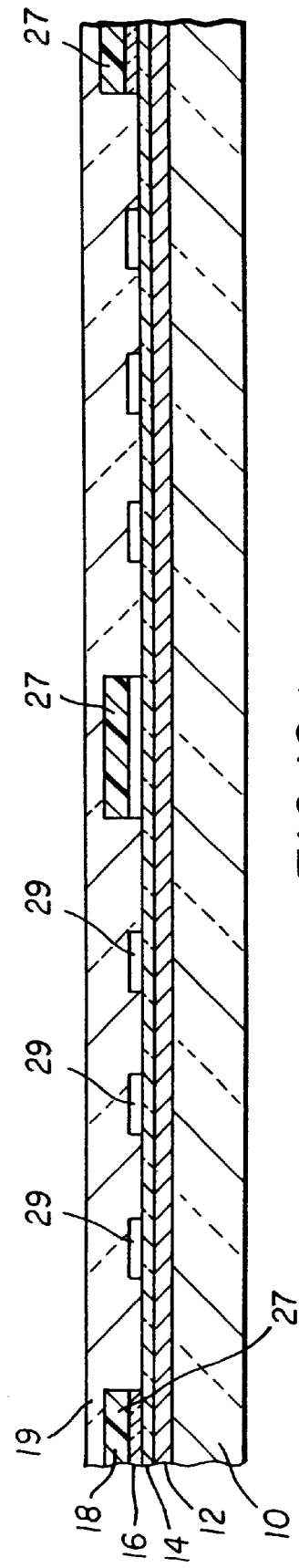

FIG. 10d illustrates planarization of the sacrificial layer 19 to a level above the top surface of the intermediate supports 27. The sacrificial layer 19 needs to be substantially flat after planarization with some sacrificial material left above the intermediate supports 27 to prevent attachment of the elongated conductive reflective ribbon element 23b to the intermediate supports 27. Furthermore, to improve the uniformity of planarization and ensure good attachment of the elongated conductive reflective ribbon element 23b to the end supports 24a and 24b, it is preferable to pattern and remove the sacrificial layer 19 outside of the active region 8 (not shown in FIG. 10d).

FIG. 10e illustrates deposition of the ribbon layer 20 and of the reflective and conductive layer 22. The ribbon layer 20 does not make contact with the top surface of the intermediate supports 27 because of the sacrificial material present in the intermediate support gap 60. The elongated conductive reflective ribbon elements 23a–23d are now patterned from the ribbon layer 20 and the reflective and conductive layer 22 using photolithographic processing and etching. This etching process defines the top-view geometry of the elongated conductive reflective ribbon elements 23a–23d shown in FIG. 2.

FIG. 10f illustrates removal of the sacrificial layer 19 from within the active region 8 to reveal channels 25 and intermediate supports 27. This step also removes the sacrificial layer 19 from the intermediate support gap 60, thereby suspending the elongated conductive reflective ribbon element 22b above the top surface of the intermediate supports 27. The elongated conductive reflective ribbon element 23b is held in tension above the intermediate supports 27 by the two end supports 24a and 24b (not shown in FIG. 10f). The removal of the sacrificial layer 19 is the final step needed to produce operational devices.

The fabrication sequences depicted in FIGS. 7a–7g and in FIGS. 10a–10f can be used to produce fully functional conformal grating devices. However, an additional annealing step before the aforementioned final removal of the sacrificial layer 19 (sometimes referred to as a release step) can improve the conformal grating device's contrast by reducing ribbon curvature. Moreover, such an annealing process will lower the rate at which the conformal grating device 5b ages from repeated actuation.

In theory, the conformal grating devices illustrated in FIGS. 1–4 would produce non-zero diffracted orders ($+1^{st}$ order 35a, $-1^{st}$ order 35b, $+2^{nd}$ order 36a and $-2^{nd}$ order 36b) that have very high contrast. This ideal situation arises if, in the unactuated state, the ribbon elements 23a, 23b, 23c and 23d are suspended perfectly flat between the intermediate supports 27 and, hence, do not cause any diffraction of light into non-zero diffracted orders. In practice, the ribbon elements 23a, 23b, 23c and 23d will have a certain amount of curvature once the sacrificial layer 19 is removed (see FIGS. 7f and 7g). The curvature arises because of stress differences between the ribbon layer 20, which is typically silicon nitride, and the reflective and conductive layer 22, which is typically aluminum. A weak grating with period Λ is then present, even when the device is not actuated. The resulting diffraction reduces the contrast of the non-zero diffracted orders. For high-quality projection displays, such as digital cinema projectors, a contrast above 1000:1 is often required. (The contrast is defined as the ratio of diffracted light intensity with the device actuated to diffracted light intensity with the device unactuated.)

Figure 11A:
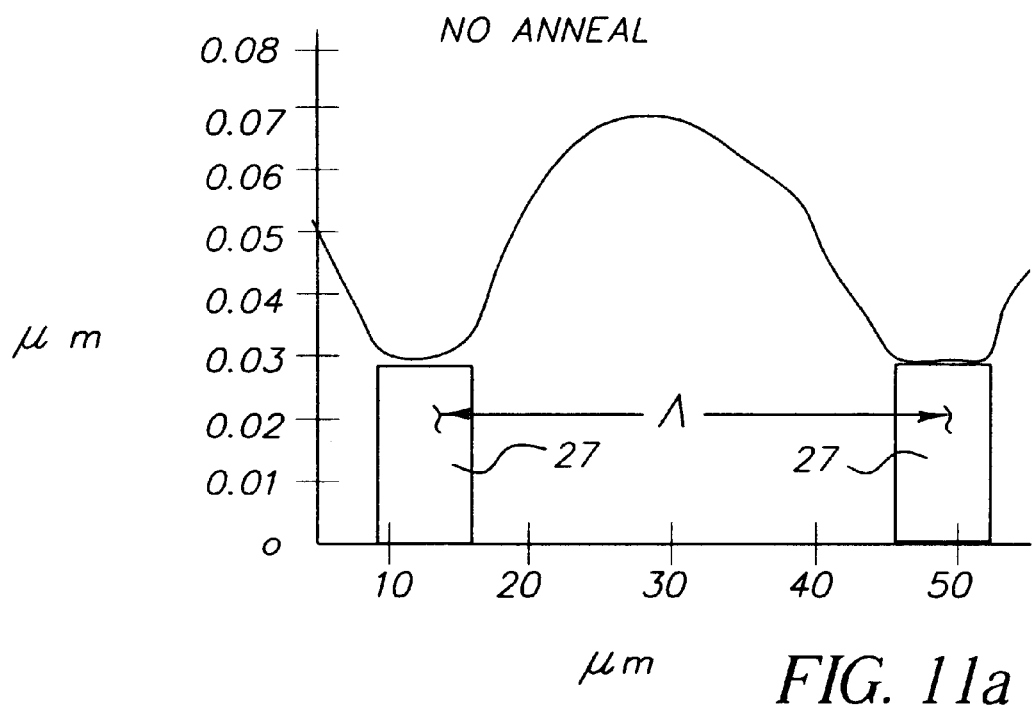
FIG. 11a shows the surface profile of an unannealed electromechanical conformal grating device along the direction of the grating period Λ.
Figure 12A:
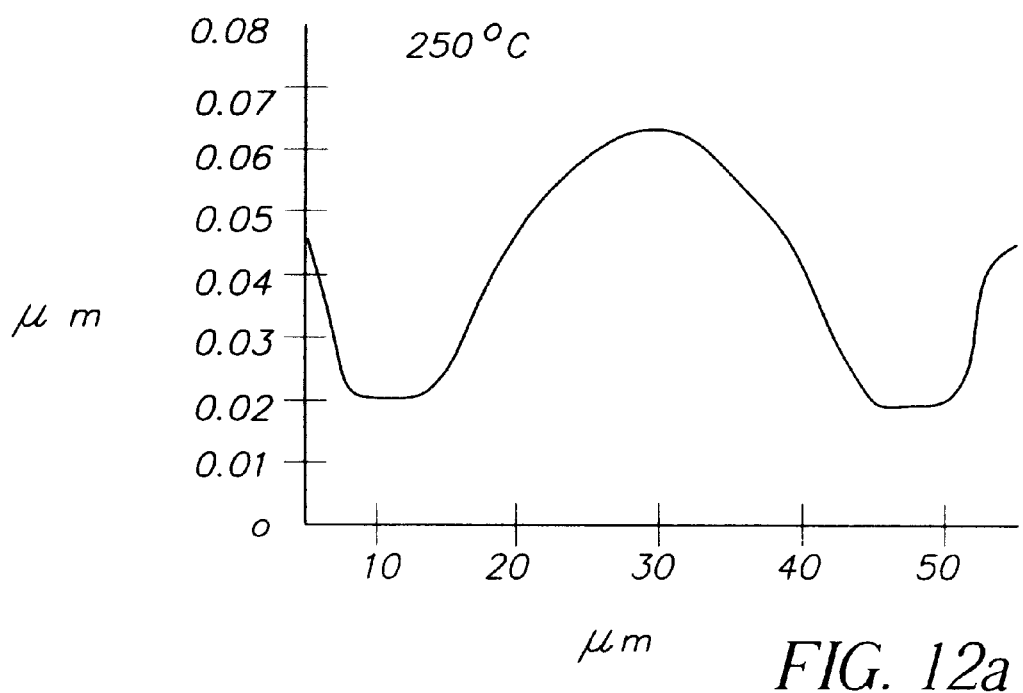
FIG. 12a shows the surface profile of an electromechanical conformal grating device along the direction of the grating period Λ for a device annealed at 250° C.
Figure 11B:
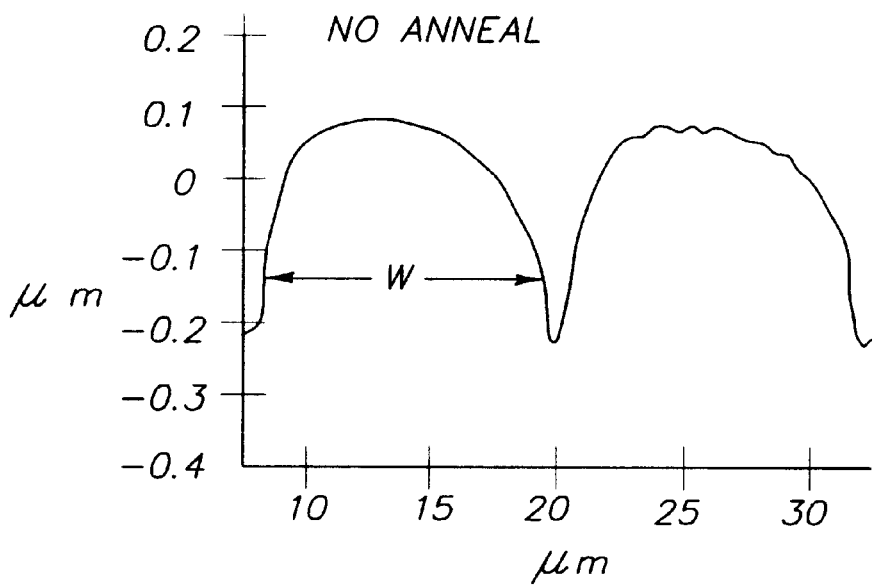
FIG. 11b shows the surface profile of an unannealed electromechanical conformal grating device along the direction of the ribbon width w.
Figure 12B:
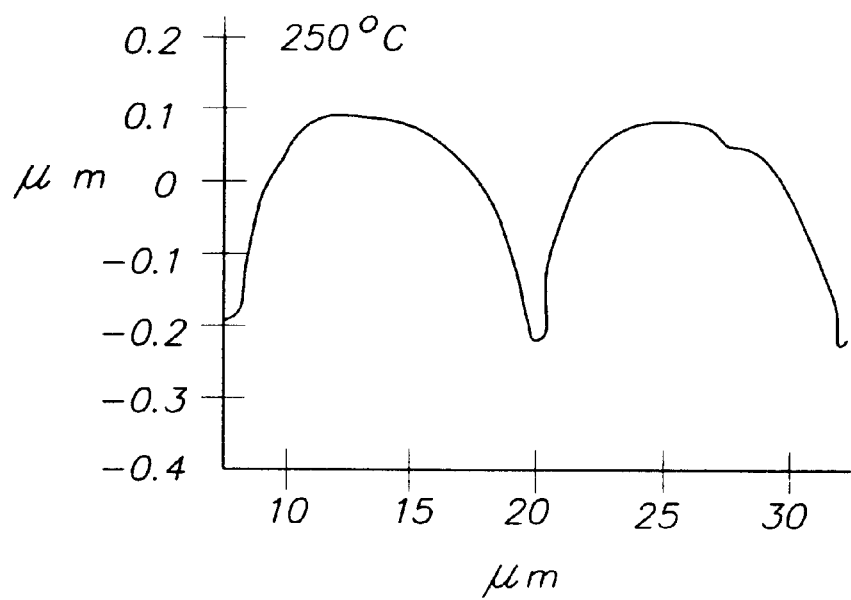
FIG. 12b shows the surface profile of an electromechanical conformal grating device along the direction of the ribbon width w for a device annealed at 250° C.
Figure 13A:
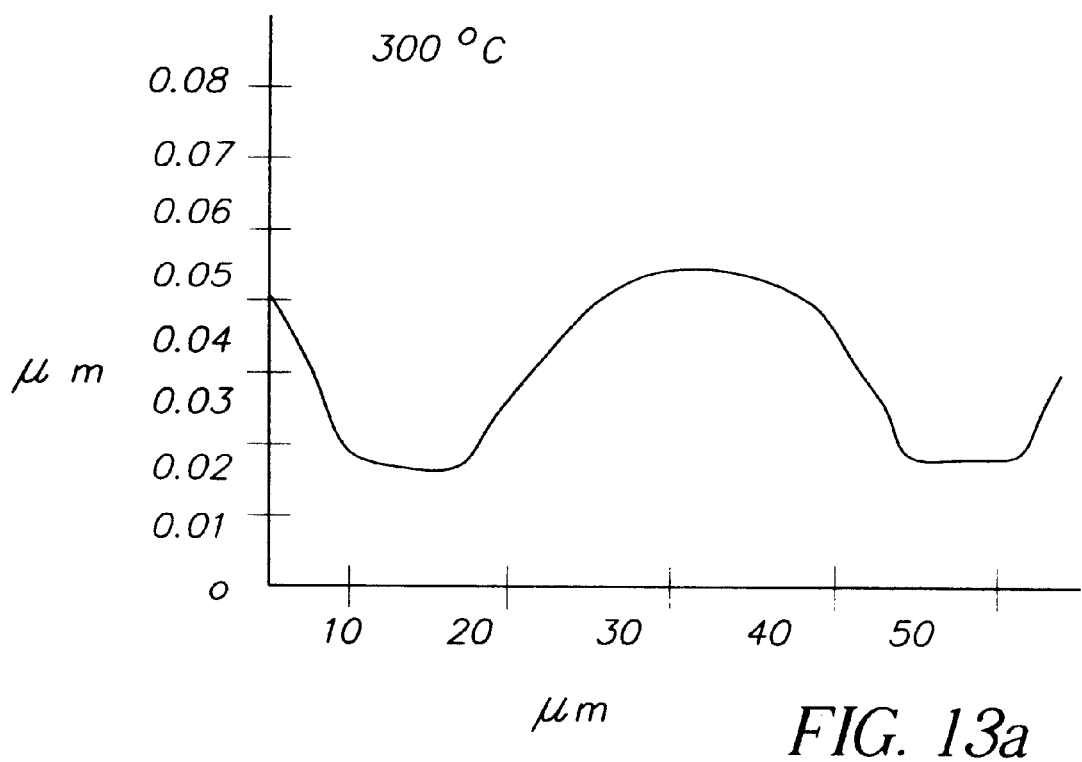
FIG. 13a shows the surface profile of an electromechanical conformal grating device along the direction of the grating period Λ for a device annealed at 300° C.
Figure 13B:
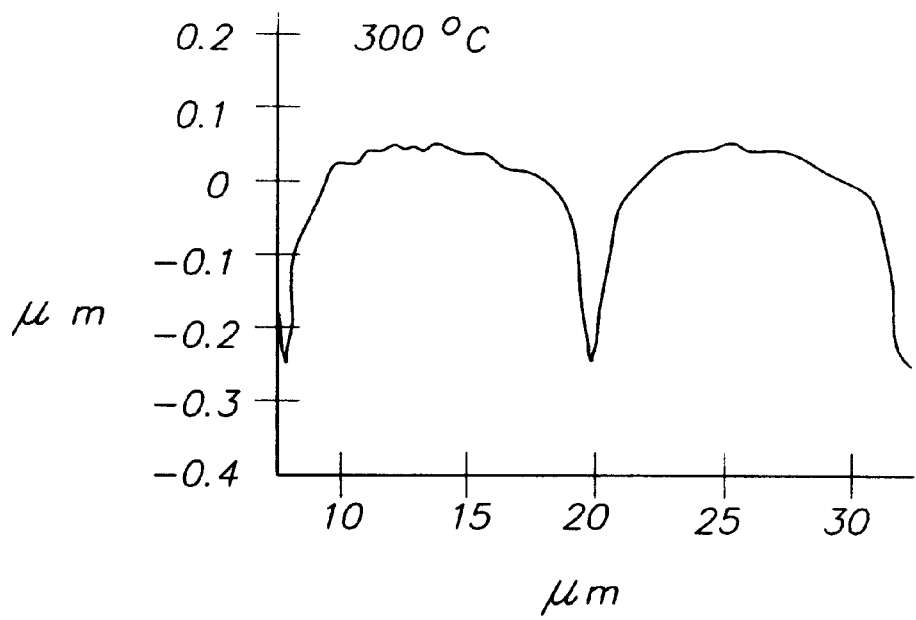
FIG. 13b shows the surface profile of an electromechanical conformal grating device along the direction of the ribbon width w for a device annealed at 300° C.

The ribbon profile along two perpendicular axes of a fabricated conformal grating device is shown in FIGS. 11a and 11b. This particular device had a 120 nm ribbon layer 20 made from high-stress silicon nitride (~1 GPa) covered by a 50 nm reflective and conductive layer 22 made from aluminum. FIG. 11a shows the surface profile along the centerline of a typical ribbon element in the direction of the grating period Λ. The location of the intermediate supports 27 is drawn in FIG. 11a to illustrate the suspension of the ribbon element above the substrate. FIG. 11b shows the ribbon profile halfway between the intermediate supports 27 in the direction of the ribbon width w. The curved ribbon profile visible in FIGS. 11a and 11b deviates significantly from the ideal devices depicted in FIGS. 1–4. This curvature would lower the contrast of non-zero diffracted orders to the point that it would be unacceptable for high-quality projection systems.

The inventors have found that the silicon nitride layer used in the ribbon layer 20 is mechanically stable to thermal cycling. Accordingly, silicon nitride's mechanical stability combined with its high yield strength makes silicon nitride an excellent material for the ribbon layer 20. The reflective and conductive layer 22, although typically thinner than the ribbon layer 20, can affect the flatness and mechanical properties of the ribbon elements 23a, 23b, 23c and 23d. Aluminum is a very good material for the reflective and conductive layer 22. It is well known in the art that aluminum thin films show stress relaxation when cycled thermally, due to the effect of the rigid layer on which it is deposited and the small grain size of the film. It is also known in the art that annealing of aluminum films can increase the mechanical stability of the film, due to grain size growth and rearrangement of atoms that permits stress relaxation.

Ribbon curvature can be reduced by the addition of a thermal annealing step to the fabrication sequence depicted in FIGS. 7a–7f. The inventors have found that optimizing the temperature of the thermal annealing step reduces the stress difference between the ribbon layer 20 and the reflective and conductive layer 22, thus producing flatter ribbon elements. In one embodiment, annealing takes place just before the sacrificial layer 19 is removed from the active region 8 of a conformal grating device (see FIGS. 7f and 7g). At this point in the fabrication sequence, all the photolithographic patterning steps needed to define the device structure have been completed. The devices are annealed in a horizontal furnace in a nitrogen ambient. Other inert oxygen-free environments would be expected to produce similar results. Effective temperatures for an anneal prior to sacrificial layer removal were found to be between 250° C. and 400° C., with a 1° C. per minute temperature ramp and a 1 hour at the maximum temperature. Temperatures below 250° C. were found to have little impact on ribbon curvature and those above 400° C. were found to reduce aluminum reflectivity. Annealing can also be performed after the sacrificial layer 19 has been removed and the ribbon elements are released into their final free-standing state. In this case, effective annealing temperatures were found to be lower than those ribbon elements that are annealed before release.

Figure 14A:
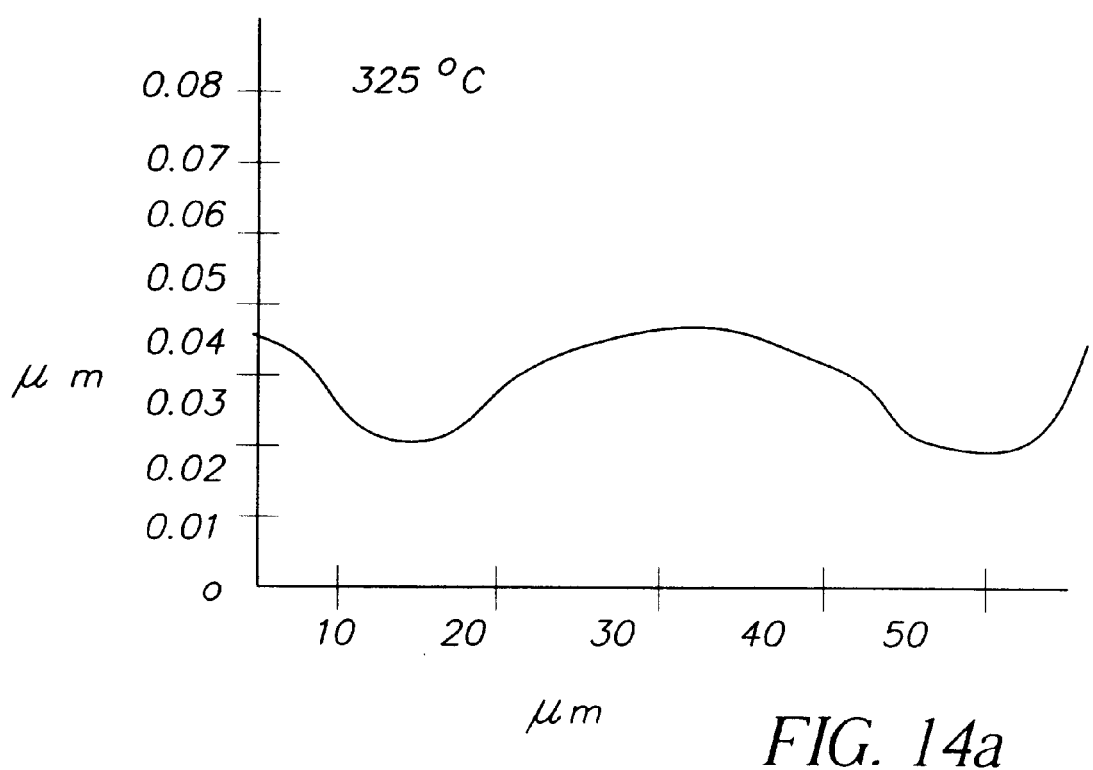
FIG. 14a shows the surface profile of an electromechanical conformal grating device along the direction of the grating period Λ for a device annealed at 325° C.
Figure 14B:
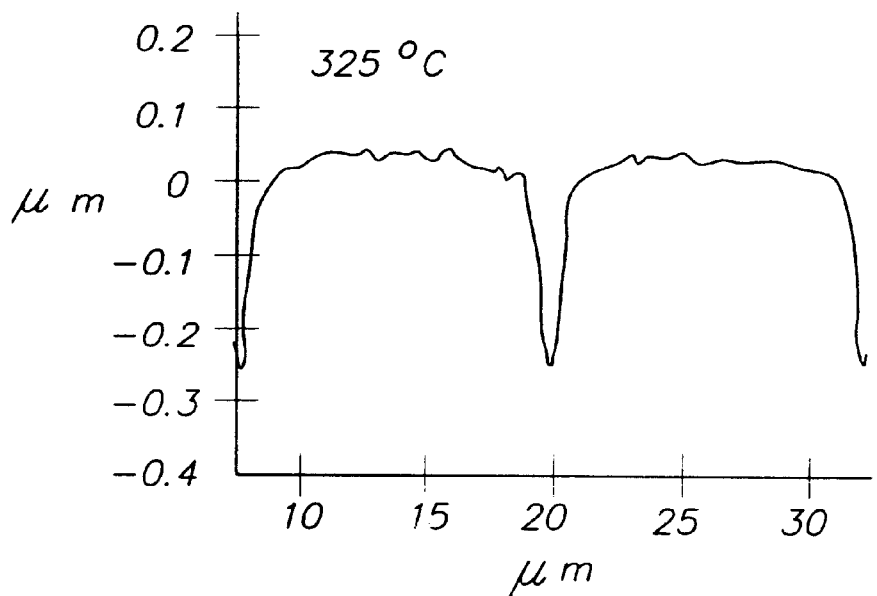
FIG. 14b shows the surface profile of an electromechanical conformal grating device along the direction of the ribbon width w for a device annealed at 325° C.

FIGS. 12a through 14b show the ribbon profiles of 3 annealed devices with 120 nm silicon nitride ribbons covered by 50 nm of aluminum. The annealing temperatures were as follows: 250° C. in FIGS. 12a and 12b, 300° C. in FIGS. 13a and 13b, and 325° C. in FIGS. 14a and 14b. The only difference between these devices and the device of FIGS. 11a and 11b is the addition of annealing prior to release in the fabrication sequence. As seen in FIGS. 14a and 14b, annealing conformal grating devices at 325° C. is effective at removing nearly all ribbon 10 curvature.

Figure 15:
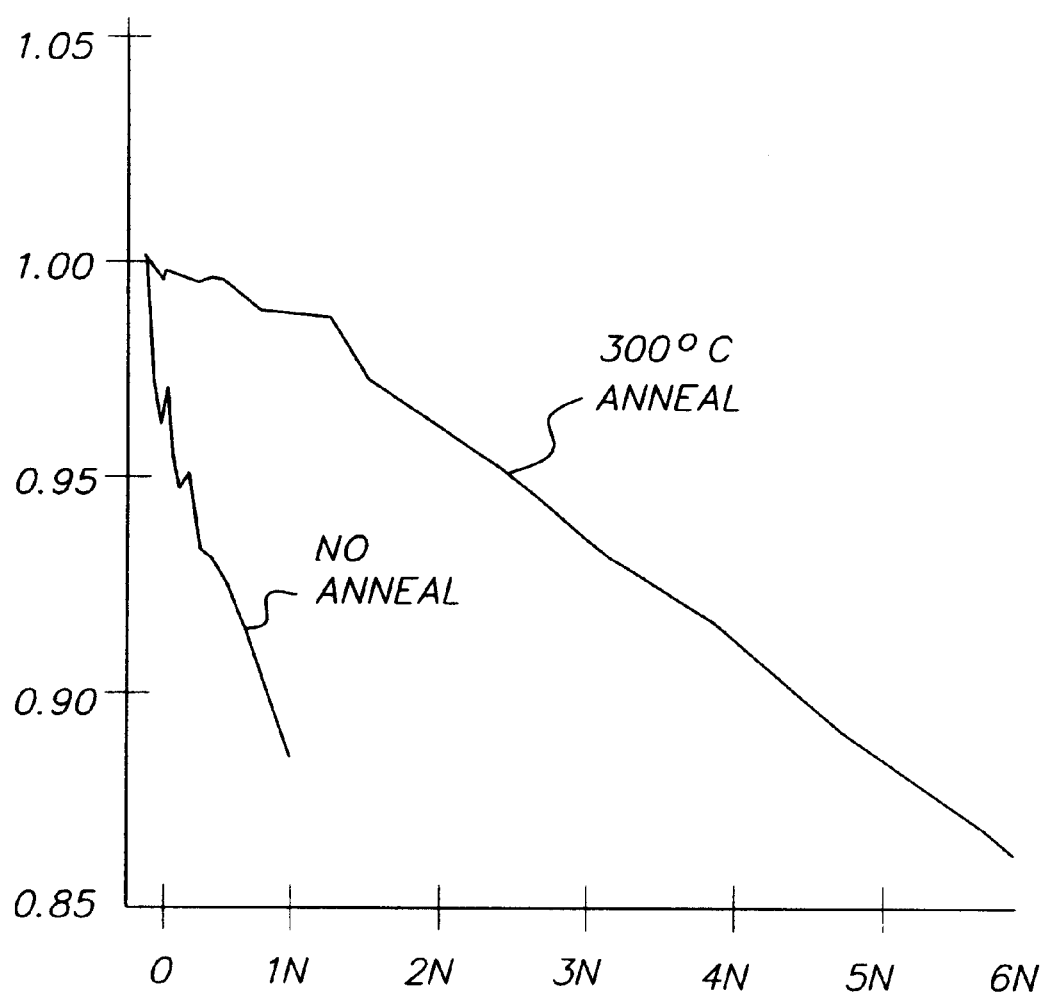
FIG. 15 shows plots of the diffracted light intensity as a function of device actuations and illustrates the impact of annealing on device lifetime.

In addition to improving ribbon curvature, annealing before release was found to improve the aging behavior of conformal grating devices with repetitive actuation. This improvement in device lifetime by annealing is illustrated in FIG. 15, which compares the aging characteristics of an unannealed device to those of a device that has been annealed at 300° C. before release. In an aging test, the devices are actuated at high frequency by repeatedly applying an operating voltage to the ribbon elements. This operating voltage is typically 10 to 20 percent above the pull-down voltage. Typical aging tests run billions to trillions of actuation cycles. As shown in FIG. 15, as the devices age, there is an appreciable drop in intensity of $1^{st}$ diffracted order at the operating voltage. The curves in FIG. 15 are normalized so that, on the vertical axis, the diffracted light intensity is initially unity, and on the horizontal axis-N, corresponds to the number of actuations for the unannealed device at the end of test. Comparing the two curves, the lifetime of the annealed device is estimated to be approximately 5 times longer than that of the unannealed device. The annealing conditions described earlier for reducing ribbon curvature were also effective at increasing lifetime.

The invention has been described in detail with particular reference to certain preferred embodiments thereof, but it will be understood that variations and modifications can be effected within the spirit and scope of the invention.

| | |
|---|---|
| 5a | conformal grating device |
| 5b | conformal grating device |
| 5c | conformal grating device |
| 5d | conformal grating device |
| 8 | active region |
| 10 | substrate |
| 11 | bottom conductive layer |
| 14 | dielectric protective layer |
| 16 | standoff layer |
| 18 | spacer layer |
| 19 | sacrificial layer |
| 20 | ribbon layer |
| 22 | reflective and conductive layer |
| 23a | elongated conductive reflective ribbon element |
| 23b | elongated conductive reflective ribbon element |
| 23c | elongated conductive reflective ribbon element |
| 23d | elongated conductive reflective ribbon element |
| 24a | end support |
| 24b | end support |
| 25 | channel |
| 27 | intermediate support |
| 28 | gap |
| 29 | standoff |
| 30 | incident light beam |
| 32 | reflected light beam |
| 35a | $+1^{st}$ order beam |
| 35b | $-1^{st}$ order beam |
| 36a | $+2^{nd}$ order beam |
| 36b | $-2^{nd}$ order beam |
| 51a | subdivided elongated conductive reflective ribbon element |
| 51b | subdivided elongated conductive reflective ribbon element |
| 51c | subdivided elongated conductive reflective ribbon element |
| 51d | subdivided elongated conductive reflective ribbon element |
| 52a | subdivided elongated conductive reflective ribbon element |
| 52b | subdivided elongated conductive reflective ribbon element |
| 52c | subdivided elongated conductive reflective ribbon element |
| 52d | subdivided elongated conductive reflective ribbon element |
| 55 | subdivided gap |
| 60 | intermediate support gap |

What is claimed is:

1. A method of manufacturing a conformal grating device, comprising the steps of:
    a) forming a spacer layer on a substrate;
    b) removing portions of the spacer layer to define an active region with at least two channels and at least one intermediate support;
    c) forming a sacrificial layer in the active region;
    d) forming conductive reflective ribbon elements over the active region;
    e) annealing the conformal grating device at an annealing temperature greater than 150° C.; and
    f) removing the sacrificial layer from the active region to release the conductive reflective ribbon elements from the sacrificial layer.

2. The method claimed in claim 1, wherein the annealing temperature has a range between 250° and 400° C.

3. The method claimed in claim 1, wherein the annealing temperature has a range between 300° and 350° C.

4. The method claimed in claim 1, wherein the conductive reflective ribbon elements include an aluminum layer.

5. The method claimed in claim 1, wherein the conductive reflective ribbon elements include a silicon nitride layer.

6. The method claimed in claim 1, wherein the conductive reflective ribbon elements include an aluminum alloy layer.

7. The method claimed in claim 1, wherein the annealing step occurs in an oxygen-free environment.

8. The method claimed in claim 1, wherein the annealing temperature is held for greater than an hour.

9. The method claimed in claim 1, wherein the removal of the sacrificial layer from the active region leaves the conductive reflective ribbon elements attached to a top surface of the at least one intermediate support.

10. The method claimed in claim 1, wherein the conductive reflective ribbons elements are formed by the steps of:
   d1) forming a ribbon layer over the substrate;
   d2) forming a reflective conductive layer on the ribbon layer; and
   d3) patterning the reflective conductive layer and the ribbon layer to form conductive reflective ribbon elements over the active regions.

11. The method claimed in claim 1, wherein the step of removing the sacrificial layer is performed by dry etching.

12. A method of manufacturing a conformal grating device, comprising the steps of:
   a) forming a conductive layer on a substrate;
   b) forming a standoff layer on the conductive layer;
   c) forming a spacer layer on the standoff layer;
   d) removing portions of the spacer layer to define an active region with at least two channels, leaving other portions of the spacer layer to define intermediate supports in the active region;
   e) patterning the standoff layer in the active region to form a plurality of standoffs;
   f) depositing a sacrificial layer over the substrate;
   g) removing the sacrificial layer from a top surface of the intermediate supports and areas outside of the active region;
   h) planarizing the sacrificial layer to a level substantially optically coplanar with the top surface of the intermediate supports;
   i) forming a ribbon layer over the substrate;
   j) forming a reflective conductive layer on the ribbon layer;
   k) patterning the reflective conductive layer and the ribbon layer to form conductive reflective ribbon elements over the active region;
   l) annealing the conformal grating device at an annealing temperature greater than 150° C.; and
   m) removing the sacrificial layer from the active region.

13. The method claimed in claim 12, wherein the sacrificial layer is completely removed from the top surface of the intermediate supports and the removal of the sacrificial layer from the active region leaves the conductive reflective ribbon elements attached to the top surface of the intermediate supports.

14. The method claimed in claim 12 wherein the reflective conductive layer is selected from the group consisting of: aluminum, aluminum alloys, titanium, gold, silver, tungsten, and silicon alloys.

15. The method claimed in claim 12, wherein the ribbon layer is selected from the group consisting of: silicon nitride, titanium aluminide, and titanium oxide.

16. The method claimed in claim 12, wherein the annealing temperature has a range between 250° and 400° C.

17. The method claimed in claim 12, wherein the annealing temperature has a range between 300° and 350° C.

18. The method claimed in claim 12, wherein the annealing step occurs in an oxygen-free environment.

19. The method claimed in claim 12, wherein the annealing temperature is held for greater than an hour.

* * * * *